US012203611B1

(12) United States Patent
Ostrander

(10) Patent No.: US 12,203,611 B1
(45) Date of Patent: Jan. 21, 2025

(54) LIGHT ENGINE AND METHOD OF SIMULATING A BURNING WAX CANDLE

(71) Applicant: CS Tech Holdings LLC, Lawrence, KS (US)

(72) Inventor: Christopher J. Ostrander, Lawrence, KS (US)

(73) Assignee: CS Tech Holdings LLC, Lawrence, KS (US)

( * ) Notice: Subject to any disclaimer, the term of this patent is extended or adjusted under 35 U.S.C. 154(b) by 0 days.

(21) Appl. No.: 18/471,152

(22) Filed: Sep. 20, 2023

Related U.S. Application Data

(63) Continuation-in-part of application No. 18/337,301, filed on Jun. 19, 2023, which is a continuation of application No. 17/813,918, filed on Jul. 20, 2022, now Pat. No. 11,680,692.

(60) Provisional application No. 63/376,320, filed on Sep. 20, 2022.

(51) Int. Cl.
*F21S 10/04* (2006.01)
*F21Y 115/10* (2016.01)

(52) U.S. Cl.
CPC ......... *F21S 10/043* (2013.01); *F21Y 2115/10* (2016.08)

(58) Field of Classification Search
CPC ..................................................... F21S 10/043
See application file for complete search history.

(56) References Cited

U.S. PATENT DOCUMENTS

| | | | |
|---|---|---|---|
| 5,379,200 | A | 1/1995 | Echard |
| 5,924,784 | A | 7/1999 | Chliwnyj et al. |
| 6,053,622 | A | 4/2000 | Horowitz et al. |
| 6,218,785 | B1 | 4/2001 | Incerti |

(Continued)

FOREIGN PATENT DOCUMENTS

| | | | |
|---|---|---|---|
| CA | 2335401 | A1 | 8/2001 |
| CA | 3010527 | A1 | 11/2016 |

(Continued)

OTHER PUBLICATIONS

Eastern Voltage Research, Digital LED Flame 1.0 Kit, www.easternvoltageresearch.com/digitalflame10.html, 2 pages.—Applicant Admitted Prior Art.

(Continued)

*Primary Examiner* — Bryon T Gyllstrom
(74) *Attorney, Agent, or Firm* — AVEK IP, LLC

(57) ABSTRACT

A lighting system includes a housing, a candle, a discrete light emission point (DLEP), a power source, and a controller. The housing has a cavity, a support surface, and an area that is translucent, transparent, and/or open. The candle is atop the support surface. The DLEP is positioned in the cavity for emitting light through the area. The controller is in communication with the DLEP and the power source to actuate the DLEP. Another lighting system includes a housing, a candle, a plurality of discrete DLEPs, and a power source. The housing has a cavity, a support surface, and an area that is translucent, transparent, and/or open. The candle is atop the support surface. The DLEPs are positioned in the cavity for emitting light through the area. At least one of the DLEPs extends from a lower face of a substrate when the lighting system in in an operating configuration.

17 Claims, 34 Drawing Sheets

(56) References Cited

U.S. PATENT DOCUMENTS

| | | | | |
|---|---|---|---|---|
| 6,241,362 | B1 * | 6/2001 | Morrison | H05B 45/20 362/101 |
| 6,595,676 | B2 | 7/2003 | Douglas | |
| 6,685,574 | B2 | 2/2004 | Hall | |
| 6,688,752 | B2 | 2/2004 | Moore | |
| 6,720,745 | B2 | 4/2004 | Lys et al. | |
| 6,802,782 | B2 | 10/2004 | Hall et al. | |
| 6,953,401 | B2 | 10/2005 | Starr | |
| 7,201,500 | B2 | 4/2007 | Mishan | |
| 7,261,455 | B2 | 8/2007 | Schnuckle et al. | |
| 7,476,002 | B2 | 1/2009 | Wolf et al. | |
| 7,553,051 | B2 | 6/2009 | Brass et al. | |
| 7,686,471 | B2 | 3/2010 | Reichow | |
| 7,762,897 | B2 | 7/2010 | Starr et al. | |
| 8,033,681 | B2 | 10/2011 | Brass et al. | |
| D665,108 | S * | 8/2012 | Rein | D26/10 |
| 8,256,935 | B1 | 9/2012 | Cullimore et al. | |
| 8,562,184 | B2 | 10/2013 | Klipstein et al. | |
| 8,696,166 | B2 | 4/2014 | Patton et al. | |
| 8,789,963 | B2 | 7/2014 | Whitfield et al. | |
| 8,956,001 | B2 * | 2/2015 | Ng | F21V 23/0457 362/161 |
| 9,068,706 | B2 | 6/2015 | Fournier et al. | |
| 9,095,782 | B2 | 8/2015 | Kaplan | |
| 9,335,014 | B2 | 5/2016 | Patton et al. | |
| 9,371,973 | B2 | 6/2016 | Li | |
| 9,423,120 | B2 | 8/2016 | Fang | |
| 9,534,956 | B2 | 1/2017 | Paolini et al. | |
| 9,551,470 | B2 * | 1/2017 | Li | F21S 10/046 |
| 9,605,824 | B1 | 3/2017 | Li | |
| 9,664,349 | B1 | 5/2017 | Hurduc et al. | |
| 9,689,544 | B2 | 6/2017 | Green, Jr. et al. | |
| 9,719,643 | B1 * | 8/2017 | Cheng | G02B 6/0006 |
| 10,125,937 | B2 | 11/2018 | Green, Jr. et al. | |
| 10,184,627 | B2 | 1/2019 | Wel | |
| 10,240,736 | B2 | 3/2019 | Green, Jr. et al. | |
| 10,436,401 | B2 | 10/2019 | Lee | |
| 10,480,734 | B2 | 11/2019 | Green et al. | |
| 10,514,141 | B1 | 12/2019 | Ostrander | |
| 10,907,787 | B2 | 2/2021 | Ostrander | |
| 10,976,019 | B2 | 4/2021 | Green et al. | |
| 11,009,201 | B1 | 5/2021 | Liao | |
| 11,118,746 | B1 | 9/2021 | Cao | |
| 11,484,617 | B2 | 11/2022 | Li | |
| 11,486,555 | B2 | 11/2022 | Li | |
| 2003/0072154 | A1 | 4/2003 | Moore | |
| 2004/0212321 | A1 | 10/2004 | Lys et al. | |
| 2005/0007779 | A1 | 1/2005 | Nozawa et al. | |
| 2006/0208666 | A1 | 9/2006 | Johnson | |
| 2008/0129226 | A1 | 6/2008 | Dewitt et al. | |
| 2008/0130266 | A1 | 6/2008 | Dewitt et al. | |
| 2009/0080871 | A1 | 3/2009 | Chiu | |
| 2009/0126241 | A1 | 5/2009 | Asofsky | |
| 2009/0313866 | A1 | 12/2009 | Wang | |
| 2010/0124050 | A1 * | 5/2010 | Hau | F21V 23/04 362/183 |
| 2010/0290238 | A1 * | 11/2010 | Howard | F21S 19/00 362/392 |
| 2011/0255272 | A1 | 10/2011 | Privas | |
| 2013/0033195 | A1 | 2/2013 | Liao | |
| 2014/0036511 | A1 | 2/2014 | Whitfield et al. | |
| 2014/0104820 | A1 | 4/2014 | Chiang | |
| 2014/0168946 | A1 | 6/2014 | Kaplan | |
| 2014/0268704 | A1 * | 9/2014 | Yang | F21S 6/001 362/185 |
| 2014/0307426 | A1 | 10/2014 | Whitfield et al. | |
| 2015/0308630 | A1 | 10/2015 | Bendtsen et al. | |
| 2016/0298816 | A1 * | 10/2016 | Fang | F21K 2/00 |
| 2016/0327227 | A1 | 11/2016 | Green, Jr. et al. | |
| 2016/0377248 | A1 | 12/2016 | Jagt et al. | |
| 2017/0159900 | A1 * | 6/2017 | Gerson | H05B 47/11 |
| 2017/0307157 | A1 | 10/2017 | Green, Jr. et al. | |
| 2017/0307159 | A1 | 10/2017 | Li | |
| 2017/0311404 | A1 * | 10/2017 | Li | H05B 47/12 |
| 2018/0135821 | A1 | 5/2018 | Wei | |
| 2020/0355336 | A1 | 11/2020 | Ostrander | |
| 2021/0254805 | A1 | 8/2021 | Green et al. | |
| 2024/0027041 | A1 | 1/2024 | Ostrander | |

FOREIGN PATENT DOCUMENTS

| | | | |
|---|---|---|---|
| CN | 1027210 | C | 12/1994 |
| CN | 2639682 | Y1 | 9/2004 |
| CN | 201034248 | Y1 | 3/2008 |
| CN | 201304248 | Y1 | 9/2009 |
| CN | 201496785 | U | 6/2010 |
| CN | 101865413 | A | 10/2010 |
| CN | 201715440 | U | 1/2011 |
| CN | 201944772 | U | 8/2011 |
| CN | 202221029 | U | 5/2012 |
| CN | 202868827 | U | 4/2013 |
| CN | 203082789 | U | 7/2013 |
| CN | 203190294 | U | 9/2013 |
| CN | 203771092 | U | 8/2014 |
| CN | 203940345 | U | 11/2014 |
| CN | 203980133 | U | 12/2014 |
| CN | 104266136 | A | 1/2015 |
| CN | 204153691 | U | 2/2015 |
| CN | 204268354 | U | 4/2015 |
| CN | 104728762 | A | 6/2015 |
| CN | 204554684 | U | 8/2015 |
| CN | 108167765 | A | 6/2018 |
| CN | 208312231 | U | 1/2019 |
| CN | 208779348 | U | 4/2019 |
| CN | 110099487 | A | 8/2019 |
| CN | 110173655 | A | 8/2019 |
| CN | 110005995 8 | | 5/2021 |
| CN | 110131659 | B | 5/2021 |
| DE | 2020120042100 | U | 8/2012 |
| EP | 3293444 | A1 | 3/2018 |
| EP | 3604901 | A1 | 2/2020 |
| GB | 2462848 | A | 2/2010 |
| WO | 2014068440 | A1 | 5/2014 |
| WO | 2016155521 | A1 | 10/2016 |
| WO | 2016177021 | A1 | 11/2016 |
| WO | 2018055386 | A1 | 3/2018 |

OTHER PUBLICATIONS

English Abstract from ESPACENET of 104728762, CN, Kind Code A, Published Jun. 24, 2015, Mumedia Photoelectric, Ltd. (This is a publication of CN 2015/10152837 filed May 5, 2015 from which priority is claimed),.

English Abstract from ESPACENET of 204554684, CN, Kind Code U, Published Aug. 12, 2015, Mumedia Photoelectric, Ltd. (This is a publication of CN 2015/20282857.7 filed May 5, 2015 from which priority is claimed).

Equinox, Flame Machine User Manual, Equinox RGB 1.5M DMX Flame Machine (FLAM11) 12 pages—Applicant Admitted Prior Art.

European Search Report, dated Nov. 15, 2019, 2 pages, issued in EP Application No. 19193556.

Extended European Search Report, dated Feb. 9, 2018, 7 pages, issued in EP Application No. 16789015.1.

First Search dated Apr. 22, 2016, 1 page, issued in CN Application No. 2015101528372.

International Search Report, dated Apr. 21, 2016, 2 pages, issued in PCT Application No. PCT/CN2016/071583.

Non-Final Office Action, dated Apr. 30, 2020, 9 pages, issued in U.S. Appl. No. 16/725,492.

Non-Final Rejection, dated Mar. 29, 2018, 8 pages, issued in U.S. Appl. No. 15/571,858.

Paralax Inc., BlinkM Smart LED product on website, www.parallax.com/product/32325, 4 pages.

Parallax Inc., BlinkM Smart LED product on website, www.digikey.com/product-detail/en/parallax-inc/32325/32325-ND/3974652, 2 pages—Applicant Admitted Prior Art.

ThingM Labs, BlinkM Datasheet for BlinkM & BlinkM MinM MaxM (2010) 50 pages, blinkm.thingm.com.

(56) References Cited

OTHER PUBLICATIONS

Website showing Realistic Flickering Flame Effect with Arduino and LED's, www.instructables.com/id/Realistic-Fire-Effect-with-Arduino-and-LEDs, 10 pages—Applicant Admitted Prior Art.

* cited by examiner

LIGHT ENGINE AND METHOD OF SIMULATING A BURNING WAX CANDLE

CROSS-REFERENCE TO RELATED APPLICATIONS

This application is a continuation-in-part of U.S. Nonprovisional patent application Ser. No. 18/337,301, filed Jun. 19, 2023, which is a continuation of U.S. Nonprovisional patent application Ser. No. 17/813,918, filed Jul. 20, 2022, issued as U.S. Pat. No. 11,680,692 on Jun. 20, 2023. This application further claims priority to U.S. Provisional Patent Application No. 63/376,320, filed Sep. 20, 2022. The entire disclosure of each is incorporated herein by reference.

FIELD OF THE DISCLOSURE

The present invention relates to lighting and, in particular, to apparatus, systems, and methods for producing lighting and lighting effects that simulate the appearance of a burning wax candle.

SUMMARY

The following presents a simplified summary of the disclosure in order to provide a basic understanding of some aspects of the invention. This summary is not an extensive overview. It is not intended to identify critical elements of the invention or to delineate the scope of the invention. Its sole purpose is to present some concepts of the invention in a simplified form as a prelude to the more detailed description that is presented elsewhere herein.

According to one embodiment, a lighting device includes a housing having a cavity and a translucent area, a plurality of discrete light emission points (DLEPs) positioned in the cavity for emitting light through the translucent area, a power source, and a controller in communication with the plurality of DLEPs and the power source to cause the plurality of DLEPs to simulate a burning wax candle. The housing is configured to imitate a wax candle. At time T1, the controller actuates a first of the DLEPs according to a first intensity value, and actuates a second of the DLEPs according to a second intensity value. At time T2, the controller actuates the first DLEP according to an altered first intensity value, and actuates the second DLEP according to an altered second intensity value. The altered first intensity value is determined by combining the first intensity value with a first change value, and the altered second intensity value is determined by combining the second intensity value with a second change value. The first change value is within a first predetermined range, and the second change value is within a second predetermined range. An increase from the first intensity value to the altered first intensity value simulates an increase in optimal flame chemistry, and an increase from the second intensity value to the altered second intensity value simulates an increase in optimal flame chemistry. A decrease from the first intensity value to the altered first intensity value simulates a decrease in optimal flame chemistry, and a decrease from the second intensity value to the altered second intensity value simulates a decrease in optimal flame chemistry. An increase in absolute value of the first change value simulates an increase in turbulence, and an increase in absolute value of the second change value simulates an increase in turbulence. A decrease in absolute value of the first change value simulates a decrease in turbulence, and a decrease in absolute value of the second change value simulates a decrease in turbulence.

According to another embodiment, a lighting device includes a housing having a cavity and a translucent area, a plurality of discrete light emission points (DLEPs) positioned in the cavity for emitting light through the translucent area, a power source, and a controller in communication with the plurality of DLEPs and the power source to cause the plurality of DLEPs to simulate a burning wax candle. The housing is configured to imitate a wax candle. The controller actuates a first of the DLEPs according to sequential first intensity values, and actuates a second of the DLEPs according to sequential second intensity values. The sequential first intensity values are determined by sequentially combining first change values to an initial first intensity value, and the sequential second intensity values are determined by sequentially combining second change values to an initial second intensity value. The first change values are randomly selected within a first predetermined range, and the second change values are randomly selected within a second predetermined range. A sequential increase in the first intensity values simulates an increase in optimal flame chemistry, and a sequential increase in the second intensity values simulates an increase in optimal flame chemistry. A sequential decrease in the first intensity values simulates a decrease in optimal flame chemistry, and a sequential decrease in the second intensity values simulates a decrease in optimal flame chemistry. A sequential increase in absolute value of the first change values simulates an increase in turbulence, and a sequential increase in absolute value of the second change values simulates an increase in turbulence. A sequential decrease in absolute value of the first change values simulates a decrease in turbulence, and a sequential decrease in absolute value of the second change values simulates a decrease in turbulence.

According to still another embodiment, a lighting system includes a housing, a candle, a discrete light emission point, a power source, and a controller. The housing has a cavity, a support surface, and an area that is at least one item selected from the group consisting of a translucent area, a transparent area, and an open area. The candle is atop the support surface. The discrete light emission point (DLEP) is positioned in the cavity for emitting light through the area toward the candle. The controller is in communication with the DLEP and the power source to actuate the DLEP.

According to yet another embodiment, a lighting device includes a housing configured to imitate a wax candle, a plurality of discrete light emission points (DLEPs), a power source, and a controller in communication with the plurality of DLEPs and the power source to cause the plurality of DLEPs to simulate a burning wax candle. The housing has a cavity and an area that is translucent, transparent, and/or open. The DLEPs are positioned in the cavity for emitting light through the area. At time T1, the controller actuates a first of the DLEPs according to a first intensity value and actuates a second of the DLEPs according to a second intensity value. At time T2, the controller actuates the first DLEP according to an altered first intensity value, and actuates the second DLEP according to an altered second intensity value. The altered first intensity value is determined by combining the first intensity value with a first change value, and the first change value is within a first predetermined range. The altered second intensity value is determined by combining the second intensity value with a second change value, and the second change value is within a second predetermined range. A simulated increase in optimal flame chemistry causes an increase from the first intensity value to the altered first intensity value. A simulated increase in optimal flame chemistry causes an increase from the second intensity value to the altered second intensity value. A simulated decrease in optimal flame chemistry causes a decrease from the first intensity value to the altered first intensity value. A simulated decrease in optimal flame chemistry causes a decrease from the second intensity value to the altered second intensity value. An increase in absolute value of the first change value simulates an increase in turbulence. An increase in absolute value of the second change value simulates an increase in turbulence. A decrease in absolute value of the first change value simulates a decrease in turbulence. A decrease in absolute value of the second change value simulates a decrease in turbulence. A simulated change in flame tilt causes a change from the first intensity value to the altered first intensity value. A simulated change in flame tilt causes a change from the second intensity value to the altered second intensity value.

According to still yet another embodiment, a method of simulating a burning wax candle includes the steps of: providing a housing configured to imitate a wax candle; actuating one or more LEDs in the housing to simulate a flame, then: actuating one or more LEDs in the housing to simulate a change in flame tilt; actuating one or more LEDs in the housing to simulate a change in optimal flame chemistry; and actuating one or more LEDs in the housing to simulate a change in turbulence.

DETAILED DESCRIPTION

Figure 1:
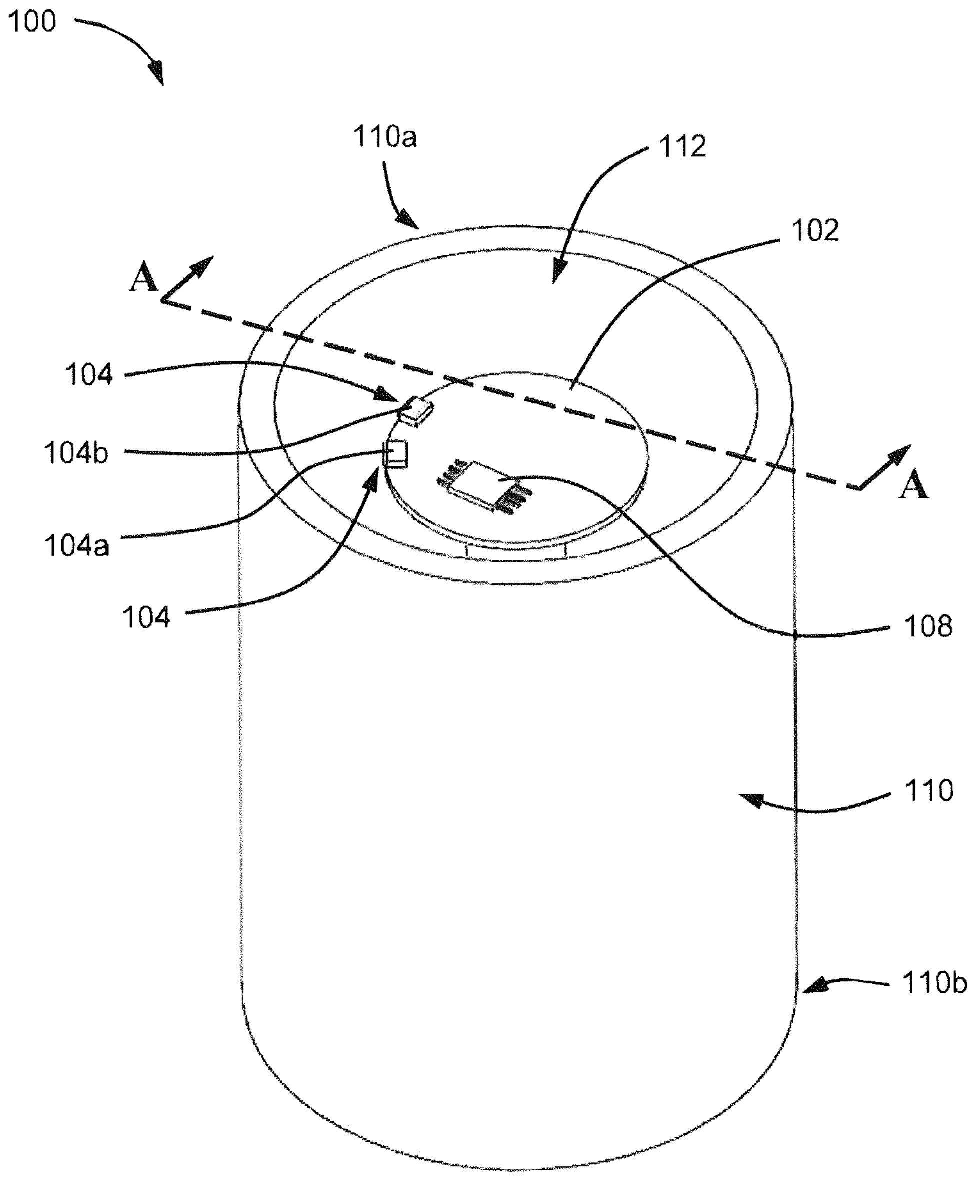
FIG. 1 is a front perspective view of a lighting device, according to an embodiment of the current disclosure.

Various embodiments are described herein in the context of devices called light engines or modules that may have the form factor of, for example, a wax candle or a light bulb with a threaded base that can be threaded into a conventional light bulb socket to provide electrical power. Embodiments can be scaled up or down within practical limits and do not have to be packaged with a conventional (e.g., threaded) light bulb base. And different interfaces to electrical power are of course possible within the current disclosure.

Further, the disclosure is not necessarily limited to solid-state light sources (which give off light by solid state electroluminescence rather than thermal radiation or fluorescence); other types of light sources may be driven in a similar regimen. And solid-state sources (e.g., LEDs, OLEDS, PLEDs, and laser diodes) themselves can vary. In one embodiment, the light source may be a red-green-blue (RGB) type LED comprising 5 wire connections (+, −, r, g, b). In another embodiment, the light source may be a red-green-blue-white (RGBW) type LED comprising 6 wire connections (+, −, r, g, b, w). In still another embodiment, the light source may be a single-color type LED which may be, in addition to red/green/blue/white, orange/warm white with a low color temperature of less than or equal to 4000 Kelvin, or bluish/cold white with a high color temperature of more than 4000 Kelvin. In embodiments, one or more light sources, individually or in combination, may be controlled and actuated with a controller, a control data line, a power line, a communication line, or any combination of these parts. In another embodiment, two groups of single color light sources (e.g., warm/orange color LEDs and cold/bluish color LEDs) may be arranged in an alternating pattern, and could be controlled and actuated with or without a control data line. For example, one acceptable type of LED is the NeoPixel® by Adafruit. In one embodiment, one or more light sources, individually or in combination, may be mounted on or into substrates which can be either rigid or flexible. In another embodiment, one or more light sources, individually or in combination, may be rigidly or flexibly connected by a power line, a data control line, a communication line, or any combination thereof. Accordingly, while LEDs are used in the examples provided herein, it shall be understood that any appropriate discrete light emission point (DLEP) may be used, including but not limited to LEDs and other light sources which are now known or later developed.

FIGS. 1 through 4 show an exemplary embodiment 100 of a lighting device according to the present invention. The lighting device 100 includes a substrate 102, a plurality of discrete light emission points 104 individually labeled 104*a*, 104*b*, a controller 108, a power source (e.g., a battery; a solar panel; another power source, whether now known or later developed; or an interface to an electrical power grid) 109, and a translucent housing (or "illumination shape") 110.

The translucent illumination shape 110 has upper and lower ends 110*a*, 110*b* and a hollow internal cavity 112, and it may be desirable in some embodiments for the upper end 110*a* to be open to the cavity 112. The discrete light emission points 104 extend from (e.g., are mounted to) the substrate 102 and are electrically coupled to the power source 109 (e.g., through wiring 109*a* and/or other appropriate power transmission hardware). The controller 108 is also mounted to the substrate 102 and powered by the power source 109, and the controller 108 is in data communication with the discrete light emission points 104. It may be particularly desirable for the substrate 102, the discrete light emission points 104, the controller 108, and the power source 109 to be located inside the cavity 112. However, in other embodiments, it may be impractical or nonsensical to locate the power source 109 in the cavity 112.

Figure 2:
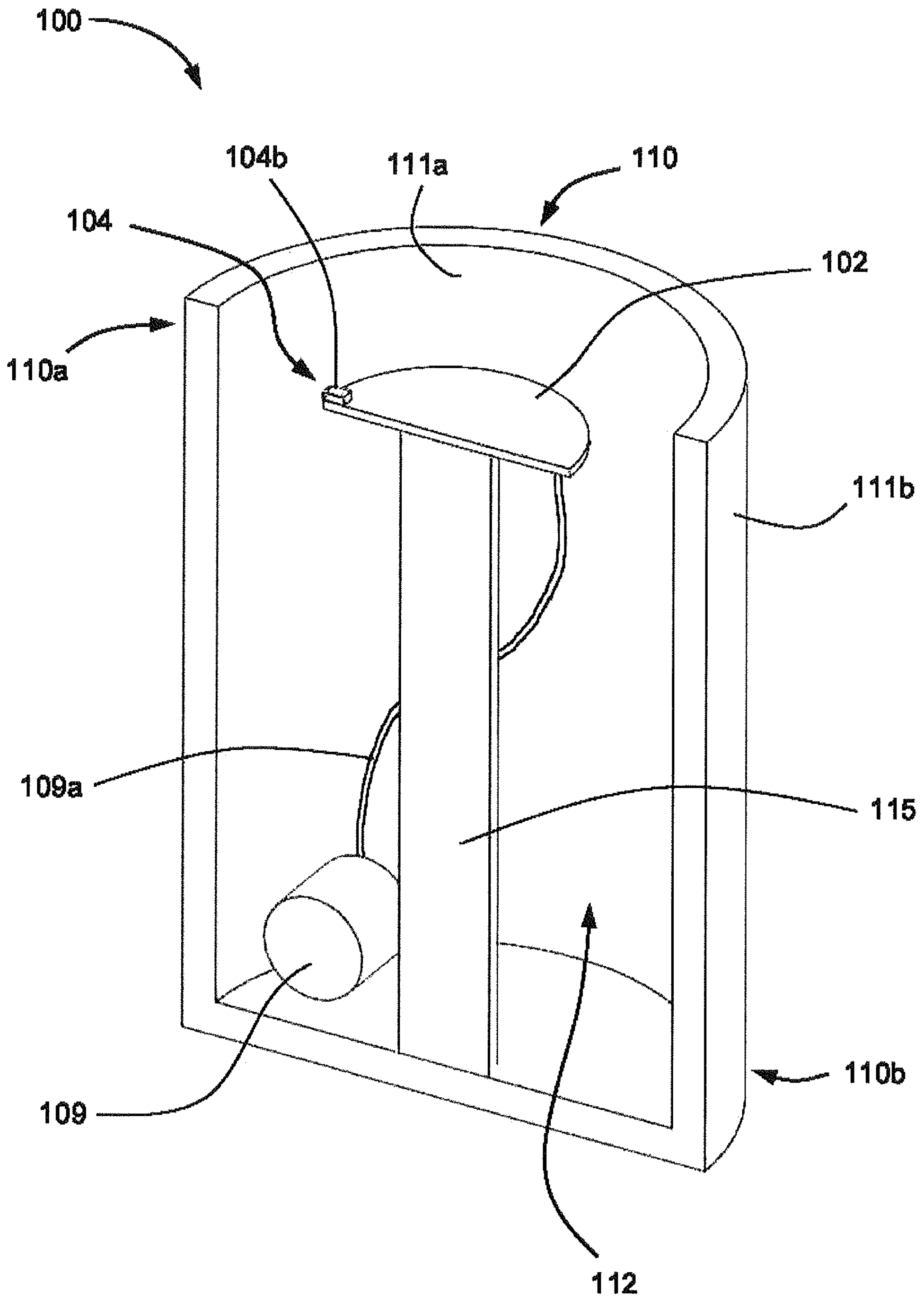
FIG. 2 is a sectional view taken along A-A of FIG. 1.

In some embodiments, as shown in FIGS. 1 and 2, the discrete light emission points 104 may be positioned along a common horizontal plane that is raised away from the illumination shape lower end 110*b*. While a stilt 115 is shown separating the substrate 102 from the illumination shape lower end 110*b*, the substrate 102 may alternately be coupled to the illumination shape 110 (e.g., inner face 111*a*) without being supported by the stilt 115. Moreover, in various embodiments, there may be multiple levels of the discrete light emission points 104 inside the cavity 112 and/or the discrete light emission points 104 may be movable vertically inside the cavity 112. For example, the substrate 102 may be mechanically movable along the stilt 115 such that the discrete light emission points may be lowered during use to simulate a change in height of the simulated flame.

Figure 3:
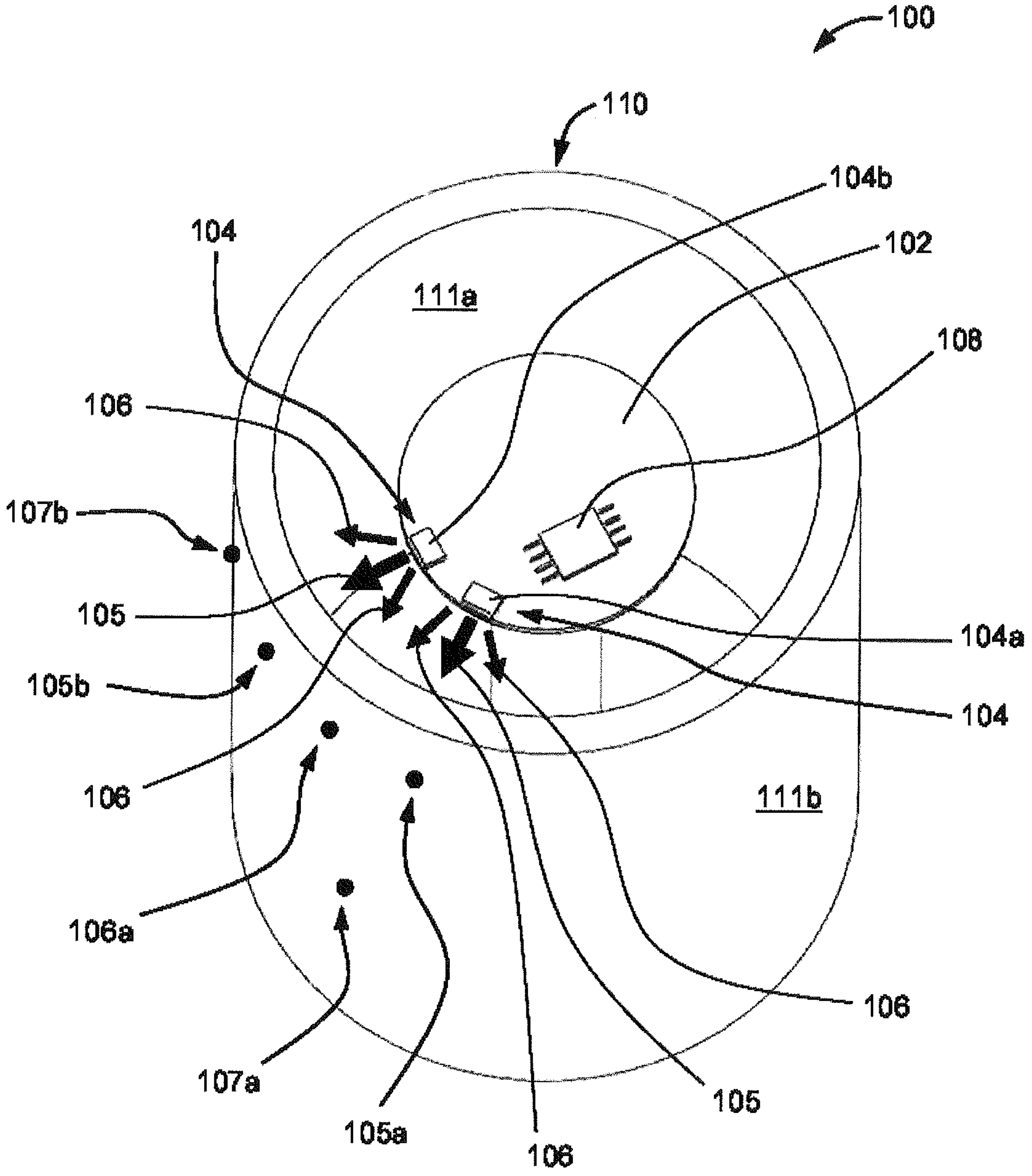
FIG. 3 is a top perspective view of the lighting device of FIG. 1.

The discrete light emission points 104 may each have a beam axis (illustrated by arrows 105 in FIGS. 3 and 4) upon which emitted light is the most intense and peripheral emissions (illustrated by arrows 106) upon which emitted light is less intense. In other words, the light emission points 104 may be directional. In some embodiments, the beam axis (or "beam direction") 105 is fixed, while in other embodiments the beam axis 105 may be adjusted manually or through automation. The light from each discrete light emission point 104 shines on, and through, the illumination shape 110, with the emitted light from each discrete light emission point 104 being the brightest along the respective beam directions 105. In FIG. 3, light from the discrete light emission point 104*a* shines through the illumination shape 110 brightest at point 105*a* on outer face 111*b* and light from the discrete light emission point 104*b* shines through the illumination shape 110 brightest at point 105*b* on the outer face 111*b*. Points 106*a*, 107*a*, and 107*b* on the outer face 111*b* do not lie along any beam direction 105. However, the point 106*a* receives light from peripheral emissions of both the discrete light emission point 104*a* and the discrete light emission point 104*b*. As such, if the discrete light emission points 104*a*, 104*b* have generally equal outputs, brightness at the point 106*a* may be the same or generally equivalent to brightness at the points 105*a*, 105*b*. As a result, area between points 105*a*, 105*b* may be smoothly lit, and brightness may fade at points further away (e.g., at the points 107*a*, 107*b*). This can be altered if desired, however, by changing a thickness, translucency, or surface texture of areas of the illumination shape 110.

Figure 4:
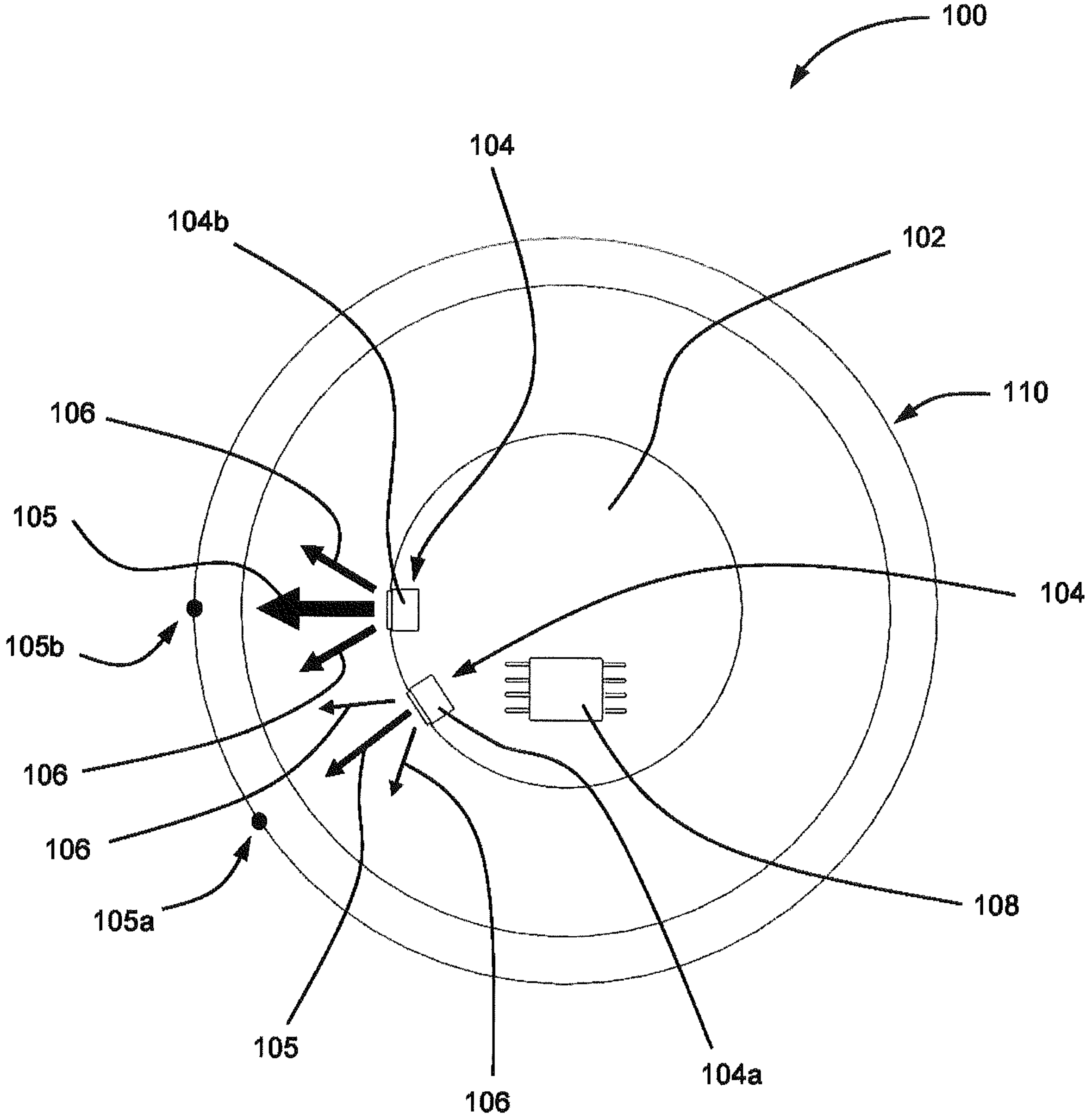
FIG. 4 is a top view of the lighting device of FIG. 1.

While the intensity (or "brightness") of each light emission point 104 is shown to be generally uniform in FIG. 3, FIG. 4 illustrates that the intensity and/or other properties can differ among the light emission points 104. For example, the controller 108 can alter (e.g., through pulse width modulation or changing voltage and/or amplitude) the brightness, color, et cetera among discrete light emission points 104. In FIG. 5, because the discrete light emission point 104*b* is brighter than the discrete light emission point 104*a*, the point 105*b* is illuminated more brightly than the point 105*a*.

Figure 5C:
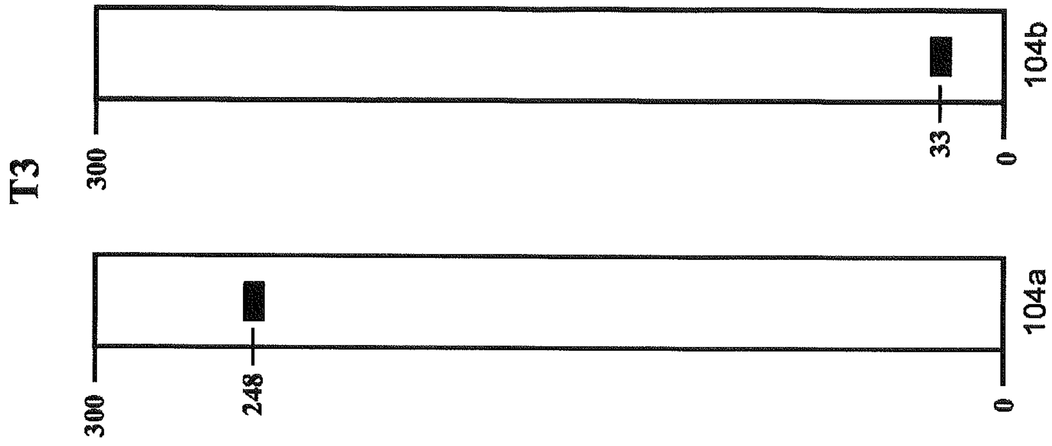
FIGS. 5A through 5C illustrate brightness levels of discrete light emission points at respective times according to one method of operation.
Figure 5B:
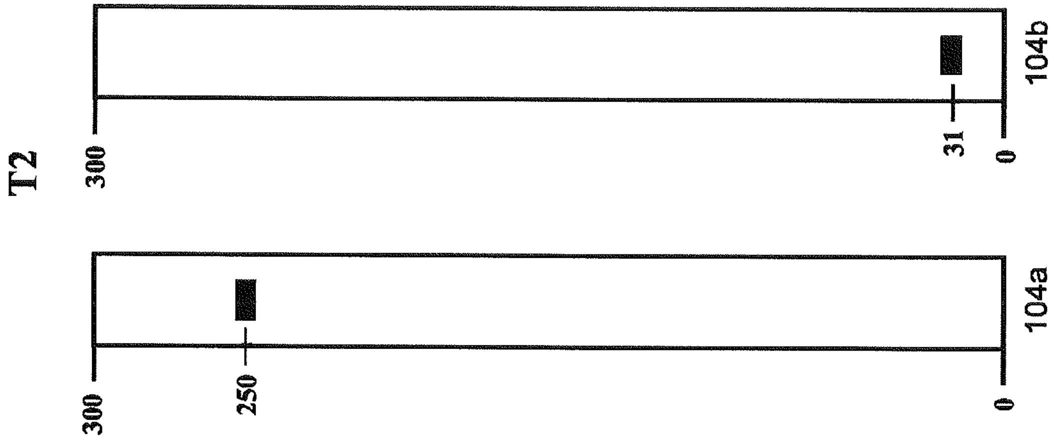
Figure 5A:
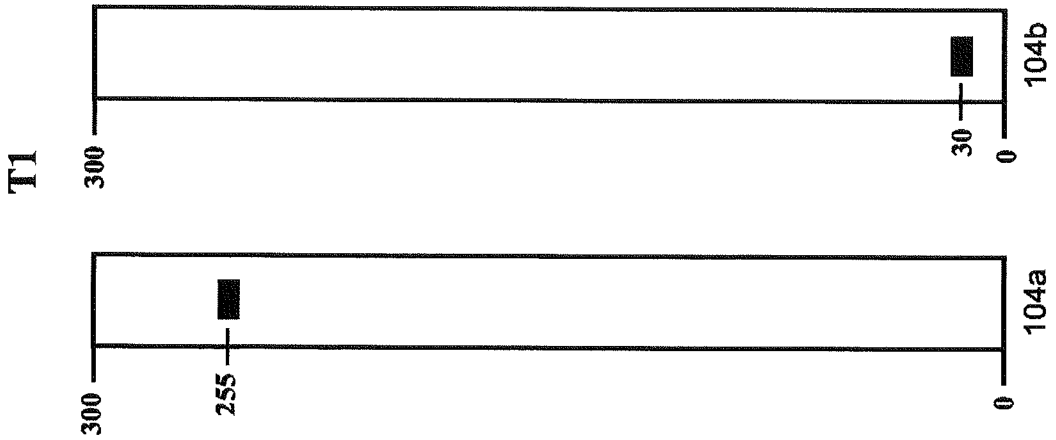

FIGS. 5A through 5C illustrate an embodiment of an operation method of simulating a burning wax candle using the light engine 100. Here, the controller 108 is altering the brightness of each discrete light emission point 104*a*, 104*b* over time. When brightness of a discrete light emission point 104 is increased, an increase in optimal chemistry about a real flame is simulated; when brightness of a discrete light emission point 104 is decreased, a decrease in optimal chemistry about a real flame is simulated.

At time T1 (FIG. 5A), the discrete light emission point 104*a* has an intensity value of 255 and the discrete light emission point 104*b* has an intensity value of 30. These values may be predetermined or randomly selected within a predetermined range (e.g., 0 to 300).

At time T2 (FIG. 5B; i.e., after time T1), the controller 108 selects a change value for each discrete light emission point 104. While the change value may be common to all light emission points 104, it may be particularly desirable for the change value to be independent for each discrete light emission point 104. Further, it may be particularly desirable for the change value to be randomly generated (e.g., by the controller 108) within a predetermined range (e.g., a range of plus/minus 7 units), though in some embodiments the change value(s) is/are predetermined. To simulate an increase in turbulence, the predetermined range may be increased (e.g., permanently, on demand from a user using an input in communication with the controller 108, according to random selection by the controller 108, or according to a preset program); and the predetermined range may be decreased (e.g., permanently, on demand from a user using an input in communication with the controller 108, according to random selection by the controller 108, or according to a preset program) to simulate a decrease in turbulence. In this example, the change value for the discrete light emission point 104*a* is −5 and the change value for the discrete light emission point 104*b* is +1. As such, the discrete light emission point 104*a* has an intensity value of 250 and the discrete light emission point 104*b* has an intensity value of 31.

At time T3 (FIG. 5C; i.e., after time T2), the controller 108 selects a change value for each discrete light emission point 104 generally as set forth above regarding time T2. Here, the change value for the discrete light emission point 104*a* is −2 and the change value for the discrete light emission point 104*b* is +2. As such, the discrete light emission point 104*a* has an intensity value of 248 and the discrete light emission point 104*b* has an intensity value of 33. One of skill in the art will appreciate that this process may continue as set forth above or as described below.

Figure 6C:
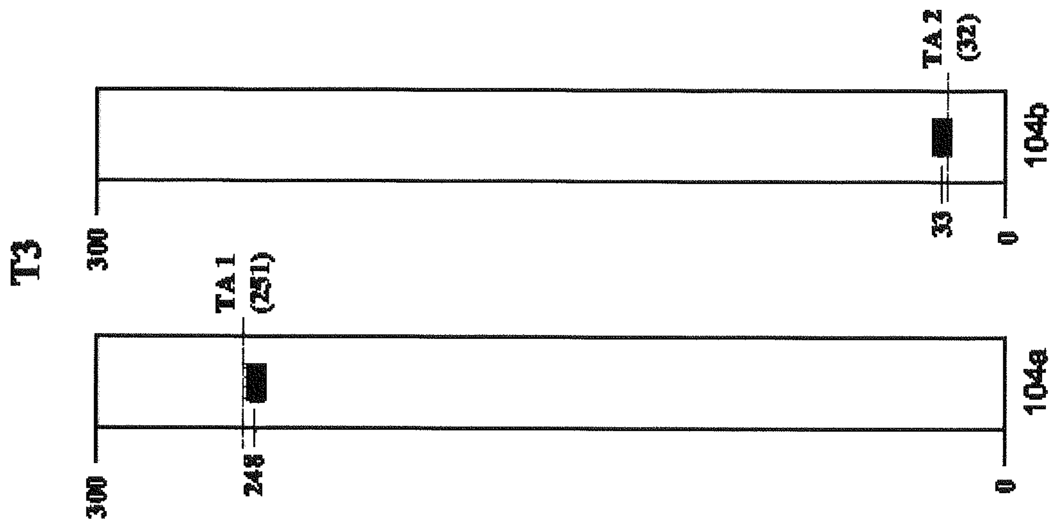
FIGS. 6A through 6C illustrate brightness levels of discrete light emission points at respective times according to another method of operation.
Figure 6B:
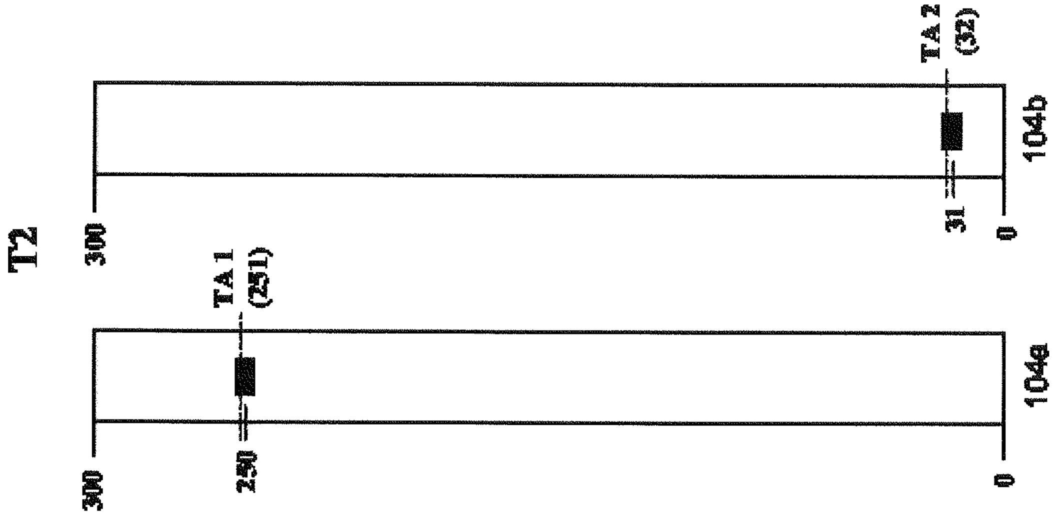
Figure 6A:
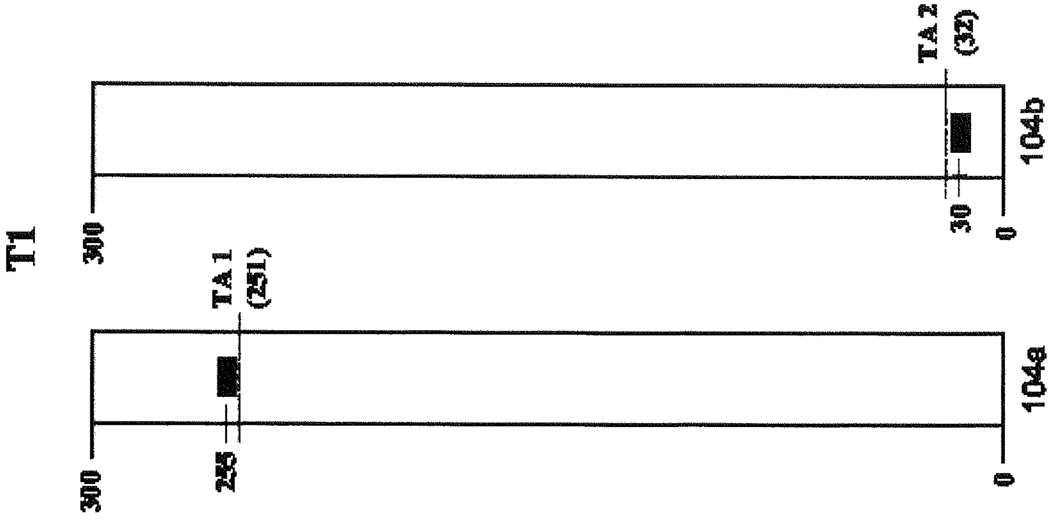

FIGS. 6A through 6C illustrate another embodiment of an operation method of simulating a burning wax candle using the light engine 100. Here, the controller 108 further includes a brightness target T—which may be randomly generated (e.g., by the controller 108), selected by a user, or selected according to a preset program—to alter the brightness of each discrete light emission point 104*a*, 104*b* over time. As with above, when brightness of a discrete light emission point 104 is increased, an increase in optimal chemistry about a real flame is simulated; when brightness of a discrete light emission point 104 is decreased, a decrease in optimal chemistry about a real flame is simulated.

At time T1 (FIG. 6A), the discrete light emission point 104*a* has an intensity value of 255 and the discrete light emission point 104*b* has an intensity value of 30. As with the method discussed with reference to FIG. 5A, these values may be predetermined or randomly selected within a predetermined range (e.g., 0 to 300). The target brightness TA1 for the discrete light emission point 104*a* is 251, and the target brightness TA2 for the discrete light emission point 104*b* is 32.

At time T2 (FIG. 6B; i.e., after time T1), the controller 108 selects a change value for each discrete light emission point 104. In this example, the change value is independent for each discrete light emission point 104, though in other embodiments the change value may be common to all light emission points 104. It may be particularly desirable for the change value to be randomly generated (e.g., by the controller 108) within a predetermined range (e.g., a range of plus/minus 7 units), though in some embodiments the change value(s) is/are predetermined. To simulate an increase in turbulence, the predetermined range may be increased (e.g., permanently, on demand from a user using an input in communication with the controller 108, according to random selection by the controller 108, or according to a preset program); and the predetermined range may be decreased (e.g., permanently, on demand from a user using an input in communication with the controller 108, according to random selection by the controller 108, or according to a preset program) to simulate a decrease in turbulence. In this example, the change value for the discrete light emission point 104*a* is 5 and the change value for the discrete light emission point 104*b* is 1. The controller 108 compares the current value and the target brightness TA1 of the discrete light emission point 104*a* and adds or subtracts the change value to/from the current value to move in the direction of the target brightness TA1. Since the current value of the discrete light emission point 104*a* is 255 and the target brightness TA1 is 251, the controller 108 subtracts the change value of 5 from the current value and sets the brightness of the discrete light emission point 104*a* at 250. Similarly, the controller 108 compares the current value and the target brightness TA2 of the discrete light emission point 104*b* and adds or subtracts the change value to/from the current value to move in the direction of the target brightness TA2. Since the current value of the discrete light emission point 104*b* is 30 and the target brightness TA2 is 32, the controller 108 adds the change value of 1 to the current value and sets the brightness of the discrete light emission point 104*b* at 31.

At time T3 (FIG. 6C; i.e., after time T2), the controller 108 selects a change value for each discrete light emission point 104 generally as set forth above regarding time T2 in FIG. 6B. Here, the change value for the discrete light emission point 104*a* is 2 and the change value for the discrete light emission point 104*b* is 2. Change values have been selected that are consistent with the change values used in the embodiment described in FIGS. 5A through 5C to illustrate different results in the embodiment shown in FIGS. 6A through 6C. The controller 108 compares the current value and the target brightness TA1 of the discrete light emission point 104*a* and adds or subtracts the change value to/from the current value to move in the direction of the target brightness TA1. Since the current value of the discrete light emission point 104*a* is 250 and the target brightness TA1 is 251, the controller 108 adds the change value of 2 from the current value and sets the brightness of the discrete light emission point 104*a* at 252. Similarly, the controller 108 compares the current value and the target brightness TA2 of the discrete light emission point 104*b* and adds or subtracts the change value to/from the current value to move in the direction of the target brightness TA2. Since the current value of the discrete light emission point 104*b* is 31 and the target brightness TA2 is 32, the controller 108 adds the change value of 2 to the current value and sets the brightness of the discrete light emission point 104*b* at 33. One of skill in the art will appreciate that this process may continue as set forth above or as described below.

Figure 7C:
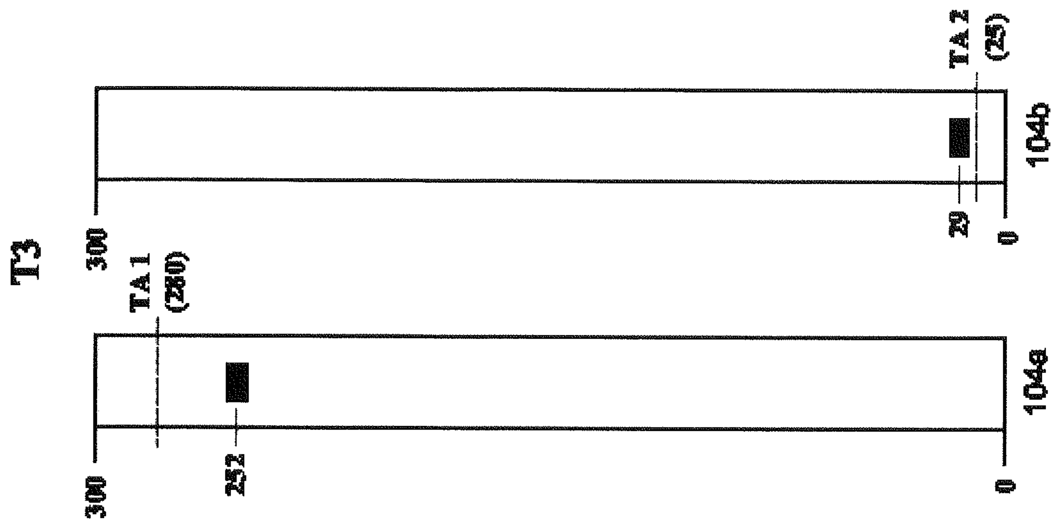
FIGS. 7A through 7C illustrate brightness levels of discrete light emission points at respective times according to yet another method of operation.
Figure 7B:
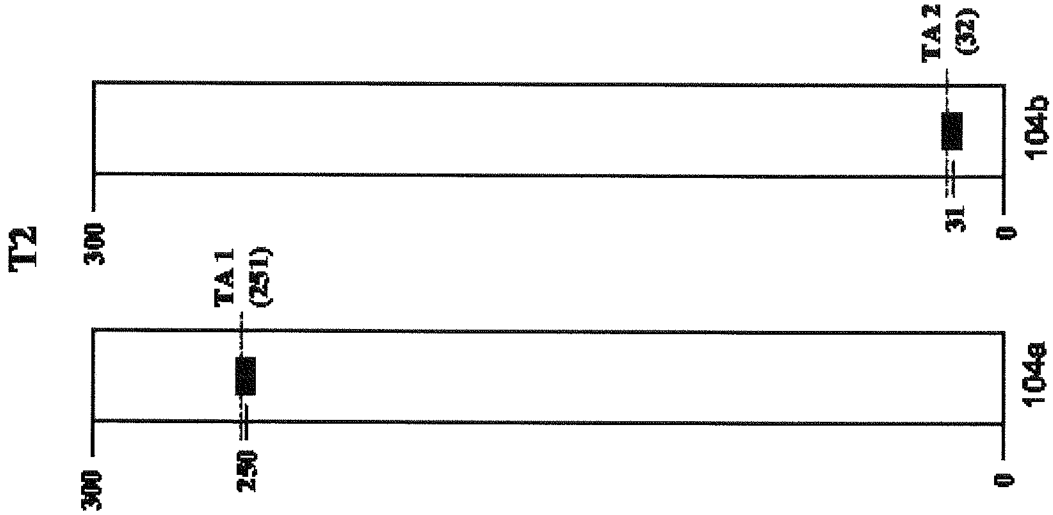
Figure 7A:
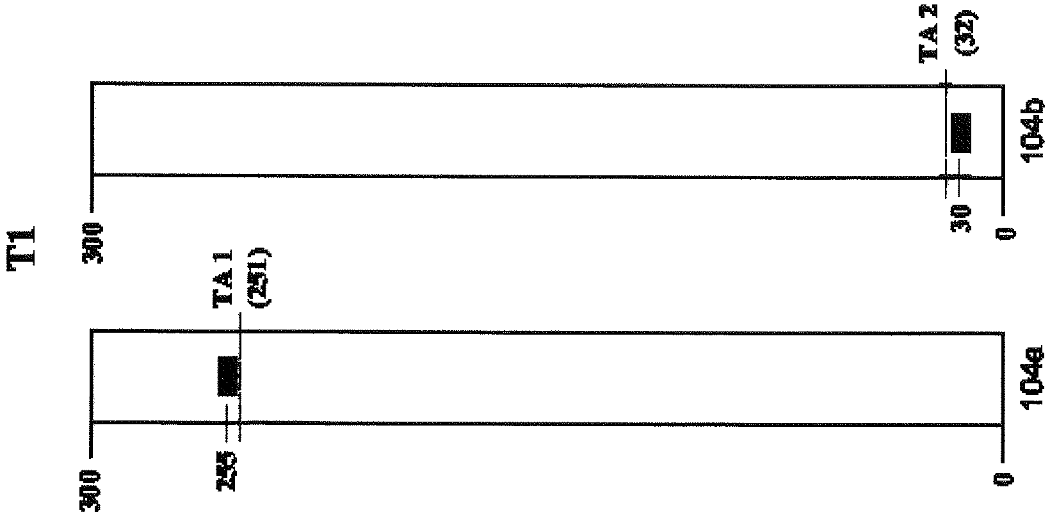

FIGS. 7A through 7C illustrate a variation of the embodiment shown in FIGS. 6A through 6C. The difference in FIGS. 7A through 7C is that once a brightness passes the respective target brightness TA1, TA2 in the method of FIGS. 7A through 7C, a new target brightness is set. In some embodiments, the target brightness for only the respective discrete light emission point 104 which passes the target brightness TA1, TA2 is reset; in other embodiments, the target brightness for more (up to all) of the discrete light emission points 104 is reset. Values have been selected that are consistent with the values used in the embodiment described in FIGS. 6A through 6C to illustrate different results in the embodiment shown in FIGS. 7A through 7C.

The method shown in FIGS. 7A and 7B proceeds the same as the method set forth in FIGS. 6A and 6B. However, once the brightness of the discrete light emission point 104*a* passes the target brightness TA1 in FIG. 7B at time T2, the controller 108 in the method of FIGS. 7A through 7C then resets the target brightness TA1 for the discrete light emission point 104*a* and the target brightness TA2 for the discrete light emission point 104*b*. The new target brightness values TA1, TA2 may be randomly generated (e.g., by the controller 108), selected by a user, or selected according to a preset program. In this example, the new target brightness TA1 is 280 and the new target brightness TA2 is 25, as shown at time T3 (FIG. 7C; i.e., after time T2).

So at time T3 in FIG. 7C, the controller 108 compares the current value and the target brightness TA1 of the discrete light emission point 104*a* and adds or subtracts the change value to/from the current value to move in the direction of the target brightness TA1. Since the current value of the discrete light emission point 104*a* is 250 and the target brightness TA1 is now 280, the controller 108 adds the change value of 2 from the current value and sets the brightness of the discrete light emission point 104*a* at 252. Similarly, the controller 108 compares the current value and the target brightness TA2 of the discrete light emission point 104*b* and adds or subtracts the change value to/from the current value to move in the direction of the target brightness TA2. Since the current value of the discrete light emission point 104*b* is 31 and the target brightness TA2 is now 25, the controller 108 subtracts the change value of 2 from the current value and sets the brightness of the discrete light emission point 104*b* at 29. One of skill in the art will appreciate that this process may continue as set forth above or as described below. Further, those skilled in the art will appreciate that supplemental operation methods may be used with the methods of FIGS. 5A through 7C and the other methods disclosed herein. For example, the controller 108 may cause the discrete light emission points 104 to flicker (or "blink") at random or predetermined times.

Figure 8:
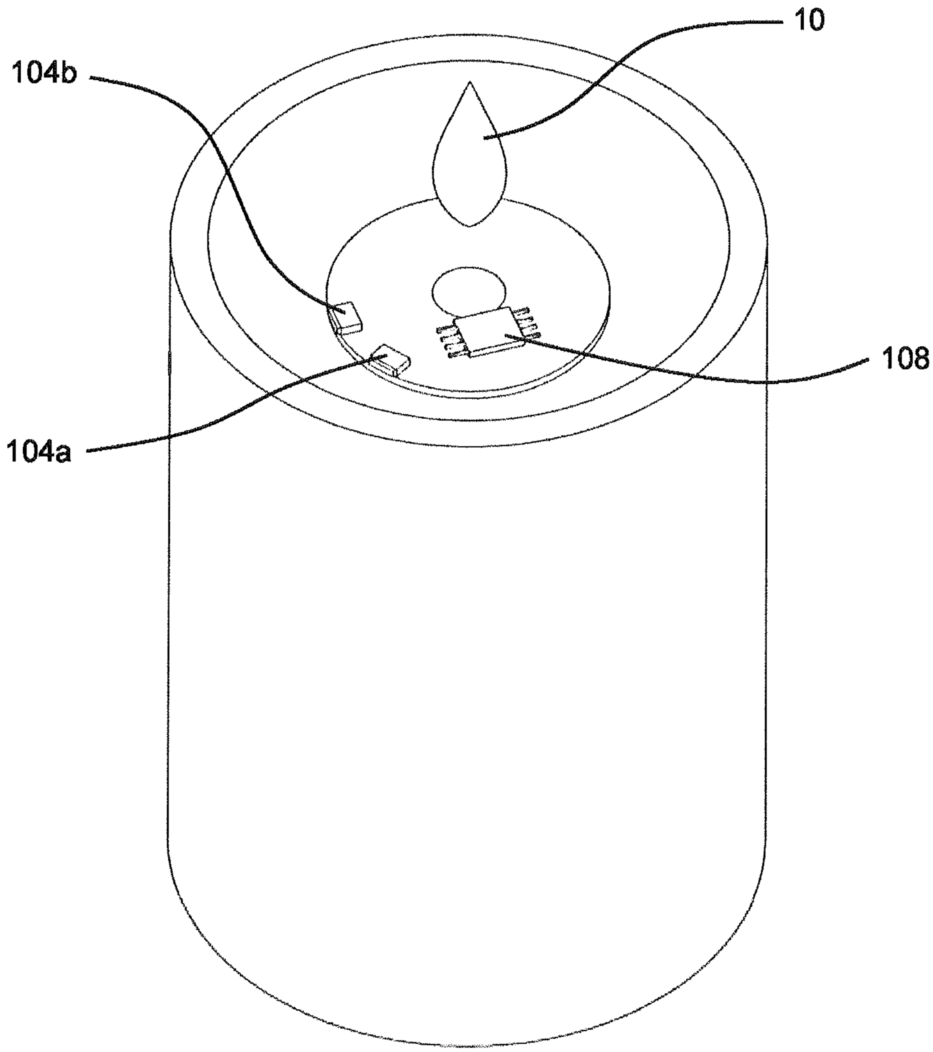
FIGS. 8 and 9 are perspective views illustrating a supplemental method of operation for the lighting device of FIG. 1.
Figure 9:
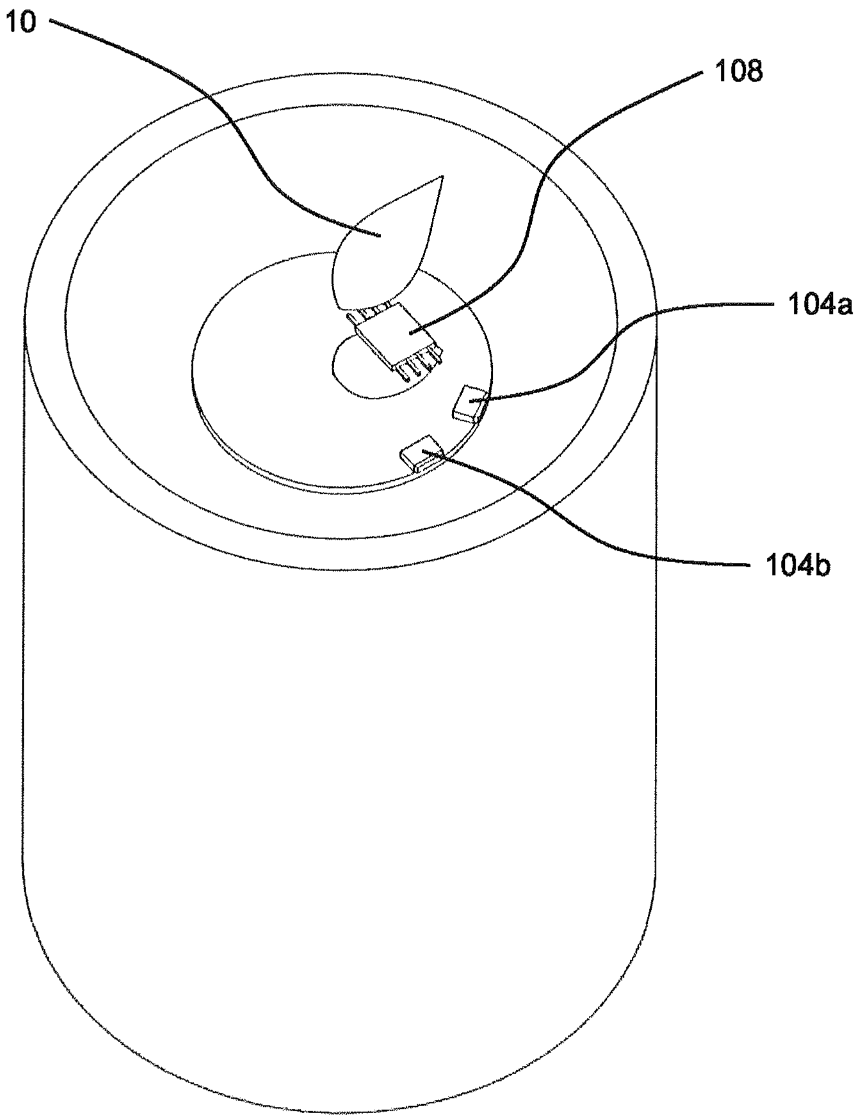
Figure 10:
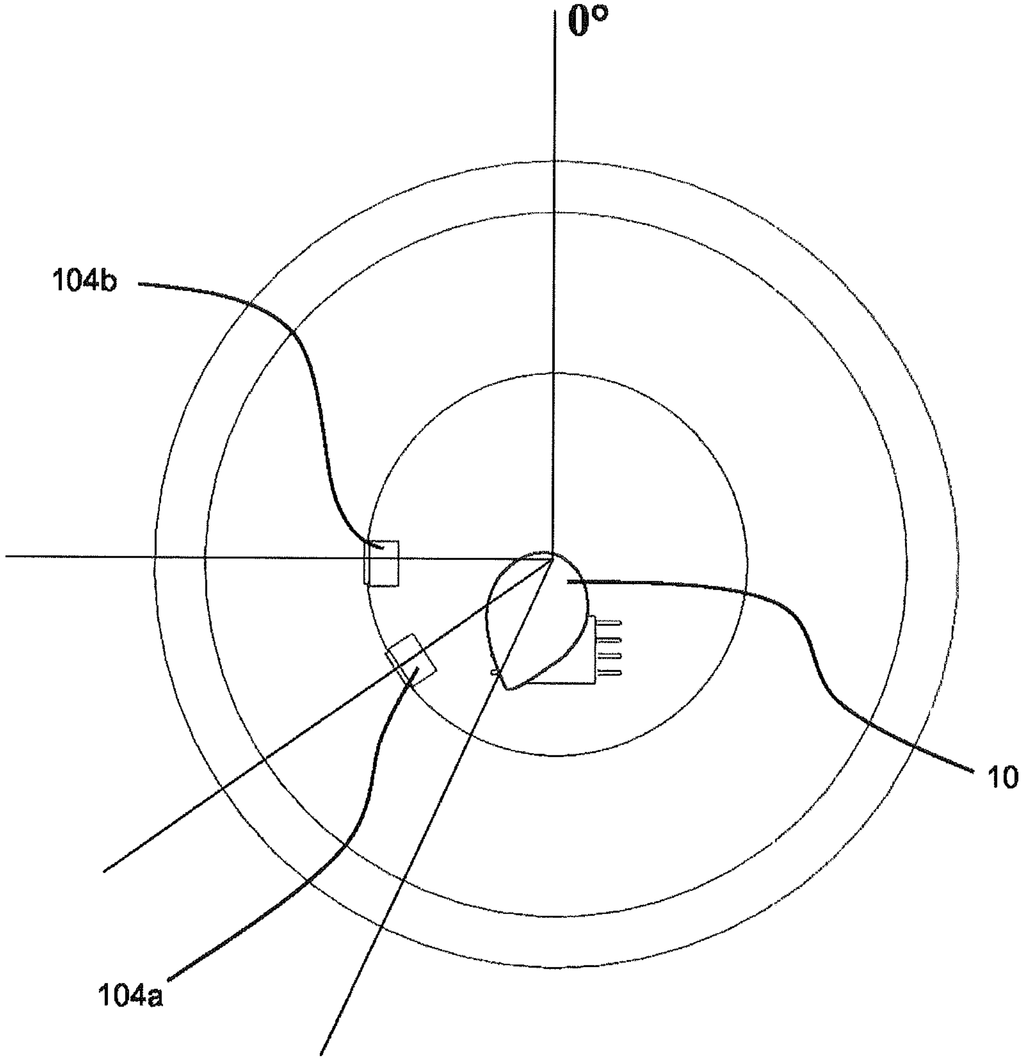
FIG. 10 is a top view of FIG. 9.

FIGS. 8 through 10 illustrate a supplemental operation method of simulating a burning wax candle using the light engine 100 that may be used with the other methods and light engines discussed herein, currently existing, or later created. More particularly, this operation method may utilize the controller (e.g., the controller 108) to simulate tilt of a wax candle's flame. FIG. 8 shows an imaginary (or "simulated") flame 10 without tilt, and FIGS. 9 and 10 show the same flame 10 with tilt.

Here, a flame tilt value (amount of tilt relative to vertical or horizontal) and a flame tilt direction (or "flame angle value") are selected; this may be accomplished, for example, by being predetermined, randomly selected by the controller 108 within predetermined ranges, or user-selected within the predetermined ranges. To simulate a vertical flame (as in FIG. 8), the flame tilt value is zero. Further, a predetermined range of limit angles is set and each discrete light emission point has a DLEP angle value that corresponds to its location. For example, as shown in FIG. 10, discrete light emission point 104*a* has a DLEP angle value of 237 degrees and discrete light emission point 104*b* has a DLEP angle value of 270 degrees (and the discrete light emission point 104*b* is offset 33 degrees relative to the discrete light emission point 104*a*). In the following example, the predetermined range of limit angles is 100. It may be particularly desirable for the predetermined range of limit angles to be at least 90, though this is not required in all embodiments.

The tilt modifier ("TM") for each respective discrete light emission point 104 may be determined by the controller 108 by the formulas:

angle delta 1=absolute value (DLEP angle value−flame angle value)

angle delta 2=360−angle delta 1 angle delta=the lesser value of (angle delta 1,angle delta 2)

if angle delta>predetermined range of limit angles, then:
if TM is a multiplier, TM=1
if TM is additive, TM=0
else TM=(predetermined range of limit angles−angle delta)*flame tilt value The tilt modifier may then be multiplied to or added to the DLEP's intensity value. Thus, for illustration, if the predetermined range of limit angles=100 degrees, flame angle value=204 degrees (FIG. 10), and flame tilt value=1.03, then to simulate the flame shown in FIGS. 9 and 10, the controller 108 determines that the discrete light emission point 104*a* has tilt modifier of 69 and that the discrete light emission point 104*b* has a tilt modifier of 35 and proceeds to actuate the discrete light emission points 104*a*, 104*b* accordingly (i.e., adding the calculated tilt modifiers to the intensity value of the respective DLEPs, though in other embodiments the tilt modifier may be a multiplier). The tilt modifier for the discrete light emission point 104*a* is calculated as follows:

angle delta 1=absolute value (237−204)=33 angle delta 2=360−33=327 angle delta=the lesser value of (33,327)=33 since 33<100, then:

TM=(100−33)*1.03=69

The tilt modifier for the discrete light emission point 104*b* is calculated as follows:

angle delta 1=absolute value (270−204)=66 angle delta 2=360−66=294 angle delta=the lesser value of (66,294)=66 since 66<100, then:

TM=(100−66)*1.03=35

Next, at time T2, the controller 108 selects a tilt change value, here randomly selected in the range of −0.03 and +0.03, and selected to be +0.025. The controller 108 then combines the tilt change value (0.025) with the prior tilt value (1.03) to determine a tilt value of 1.055. The controller also selects a tilt angle change value, here randomly selected in the range of −30 degrees to +30 degrees, and selected to be 23 degrees. The controller 108 then combines the tilt angle change value (23 degrees) with the prior tilt angle (204 degrees) to determine a tilt angle of 227 degrees. The controller 108 then determines that the discrete light emission point 104*a* has a tilt modifier of 95 and that the discrete light emission point 104*b* has a tilt modifier of 60 and proceeds to actuate the discrete light emission points 104*a*, 104*b* accordingly. One of skill in the art will appreciate that this process may continue as desired. At time T2, the tilt modifier for the discrete light emission point 104*a* is calculated as follows:

angle delta 1=absolute value (237−227)=10 angle delta 2=360−10=350 angle delta=the lesser value of (10,350)=10 since 10<100, then:

TM=(100−10)*1.055=95

At time T2, the tilt modifier for the discrete light emission point 104*b* is calculated as follows:

angle delta 1=absolute value (270−227)=43 angle delta 2=360−43=317 angle delta=the lesser value of (43,317)=43 since 43<100, then:

TM=(100−43)*1.055=60

Figure 11:
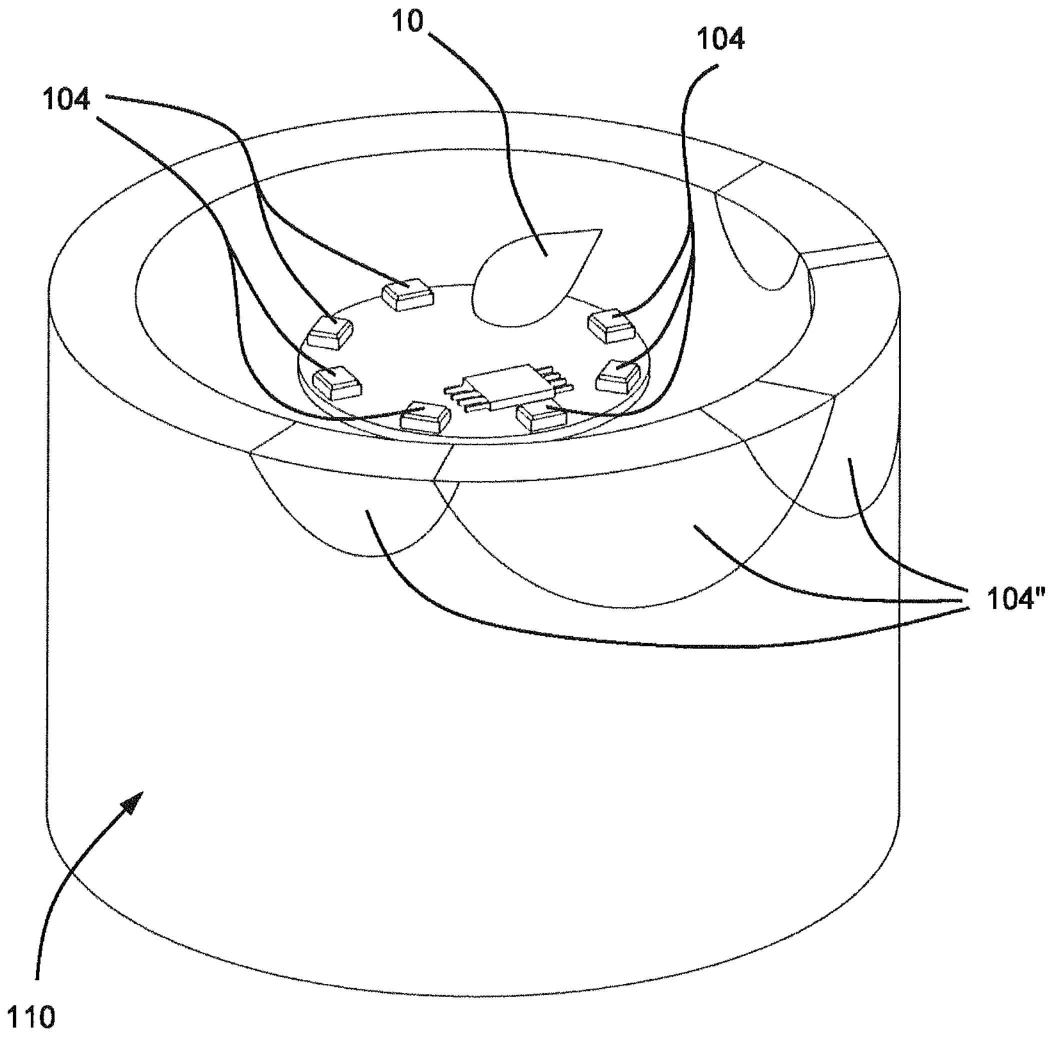
FIGS. 11 and 12 are perspective views further illustrating the method of operation of FIGS. 8 through 10.
Figure 12:
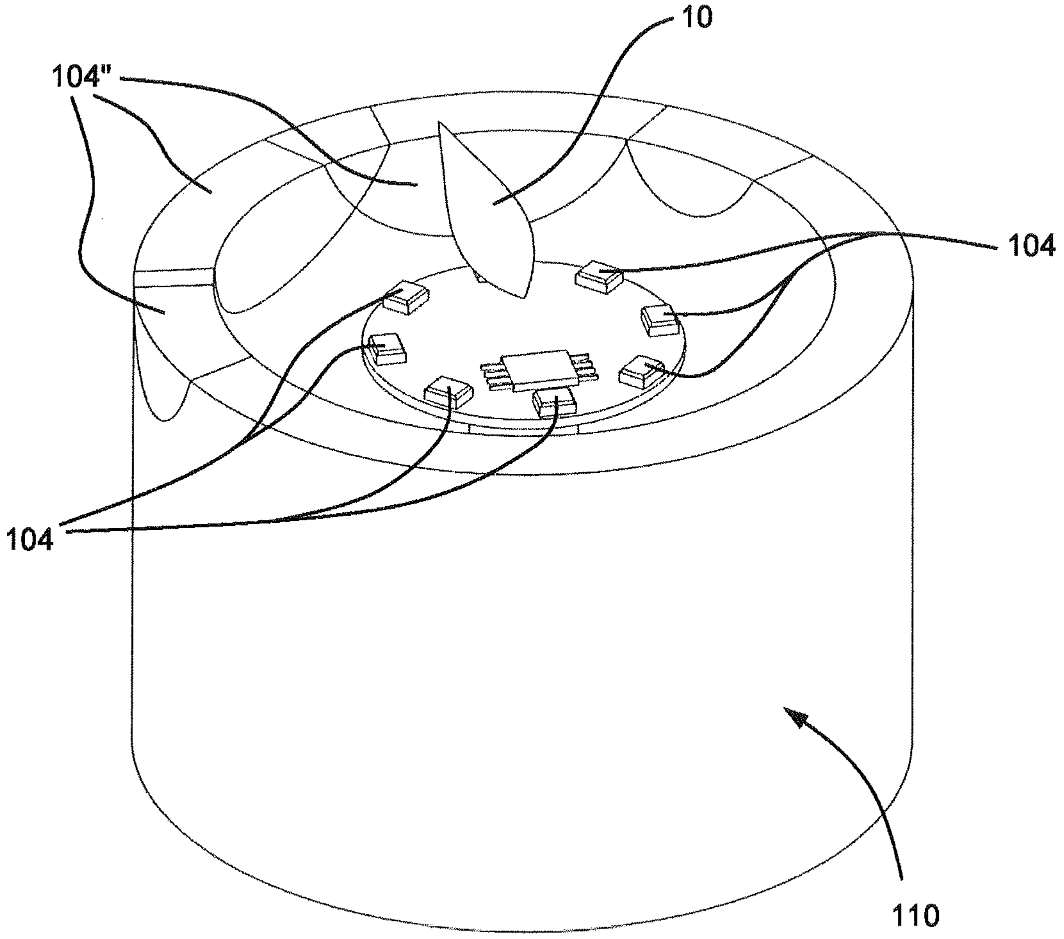

FIGS. 11 and 12 illustrate simulation of a burning wax candle using a light engine with additional discrete light emission points 104 and the supplemental operation method described above. As a result, different areas of brightness 104" from the discrete light emission points 104 result on the illumination shape 110 over time. Overlapping areas 104" have increased brightness.

Figure 13:
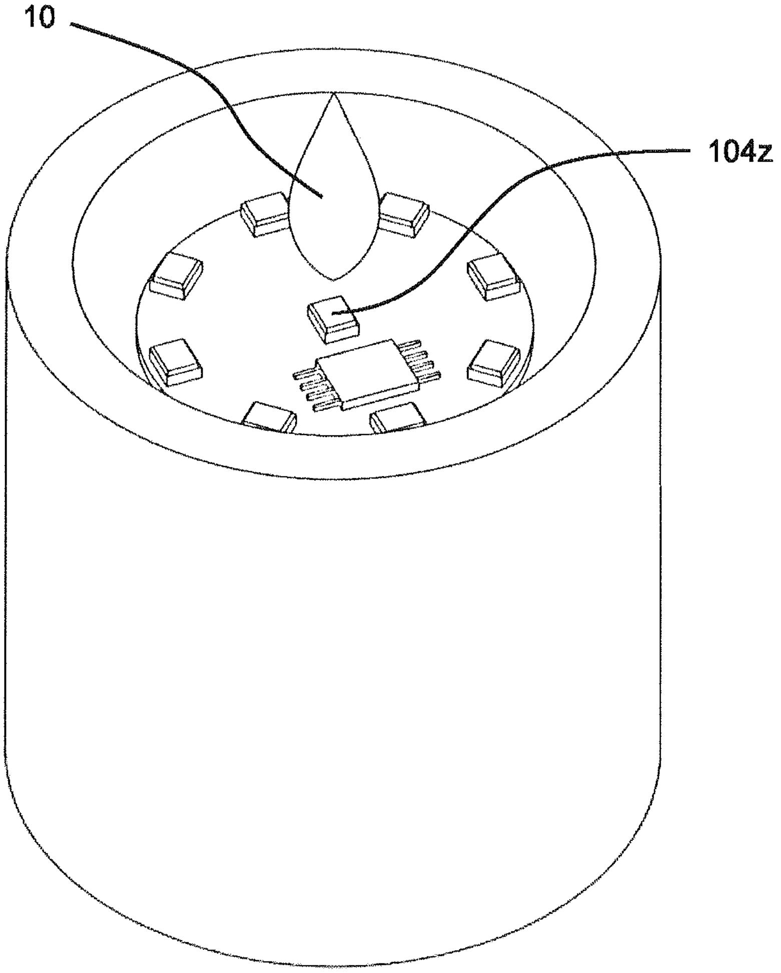
FIGS. 13 and 14 are perspective views illustrating another supplemental method of operation according to an embodiment of the current invention.
Figure 14:
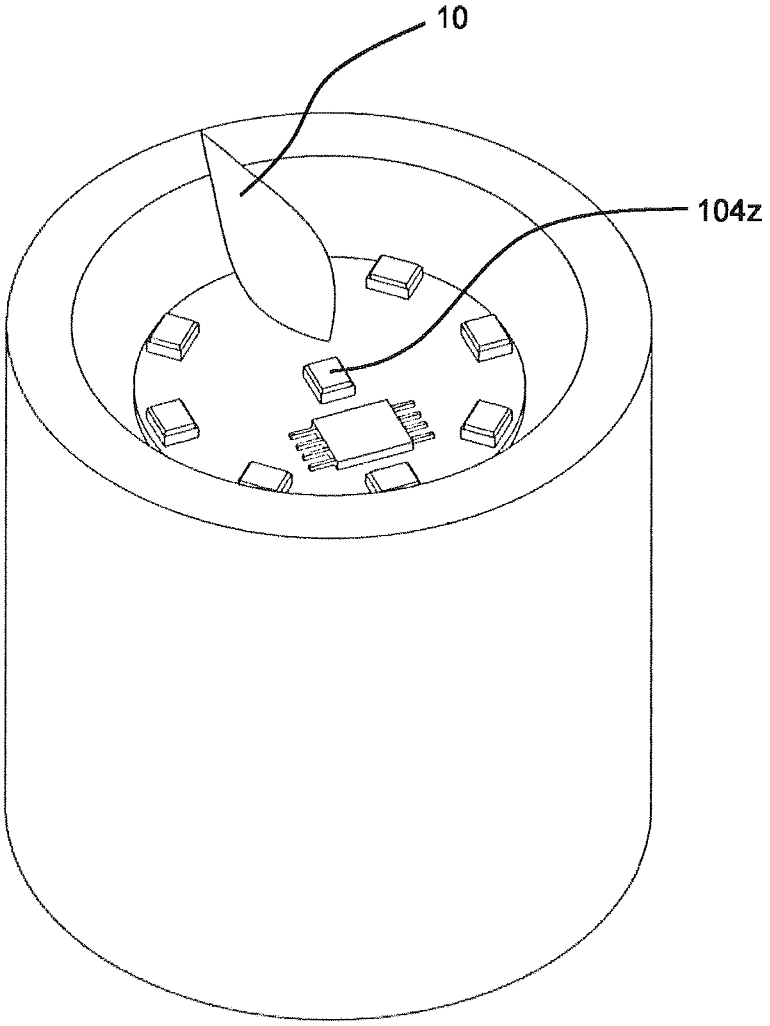

FIGS. 13 and 14 illustrate a method similar to that discussed above regarding FIGS. 8 through 12, but the light engine in FIGS. 13 and 14 further includes a central discrete light emission point 104*z* below the base of the simulated flame 10. The tilt modifier for the discrete light emission point 104*z* may be determined by the controller 108 at the various times by the following formulas, and the tilt modifier may then be multiplied to or added to the DLEP's intensity value as appropriate.

if TM is a multiplier, then:

if flame tilt value=0,TM=1 if flame tilt value≠0,TM=1/(absolute value (flame tilt value))

if TM is additive,TM=(1−flame tilt value)*constant

While the supplemental methods above identify changes in flame location using angles, those skilled in the art will appreciate that these principles will translate to other identification methods, such as x-y-z coordinate identification of a center point of the simulated flame 10, and that the intensity of the discrete light emission points 104 may still be altered accordingly.

Figure 15:
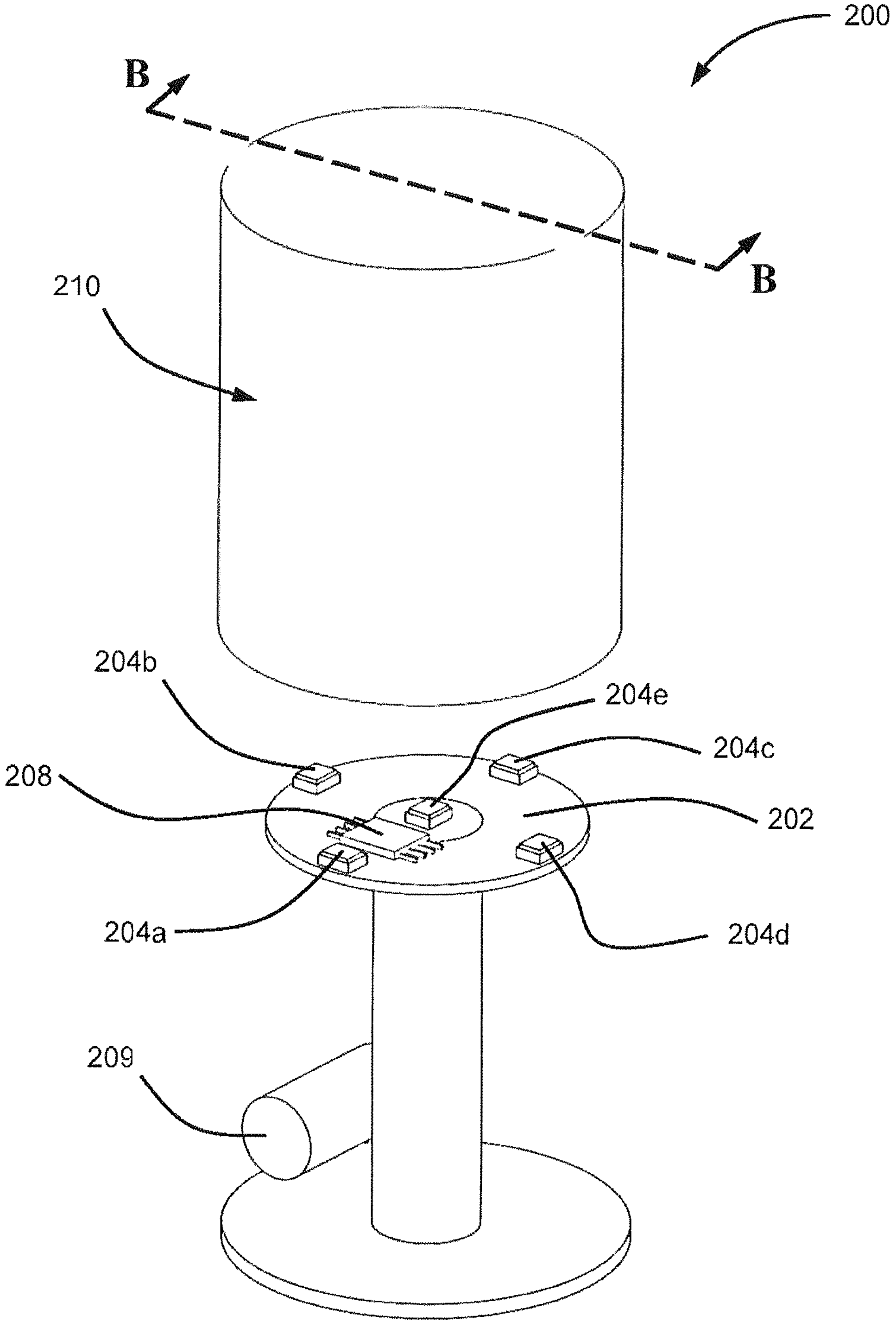
FIG. 15 is an exploded view of a lighting device according to another embodiment of the current disclosure.
Figure 16:
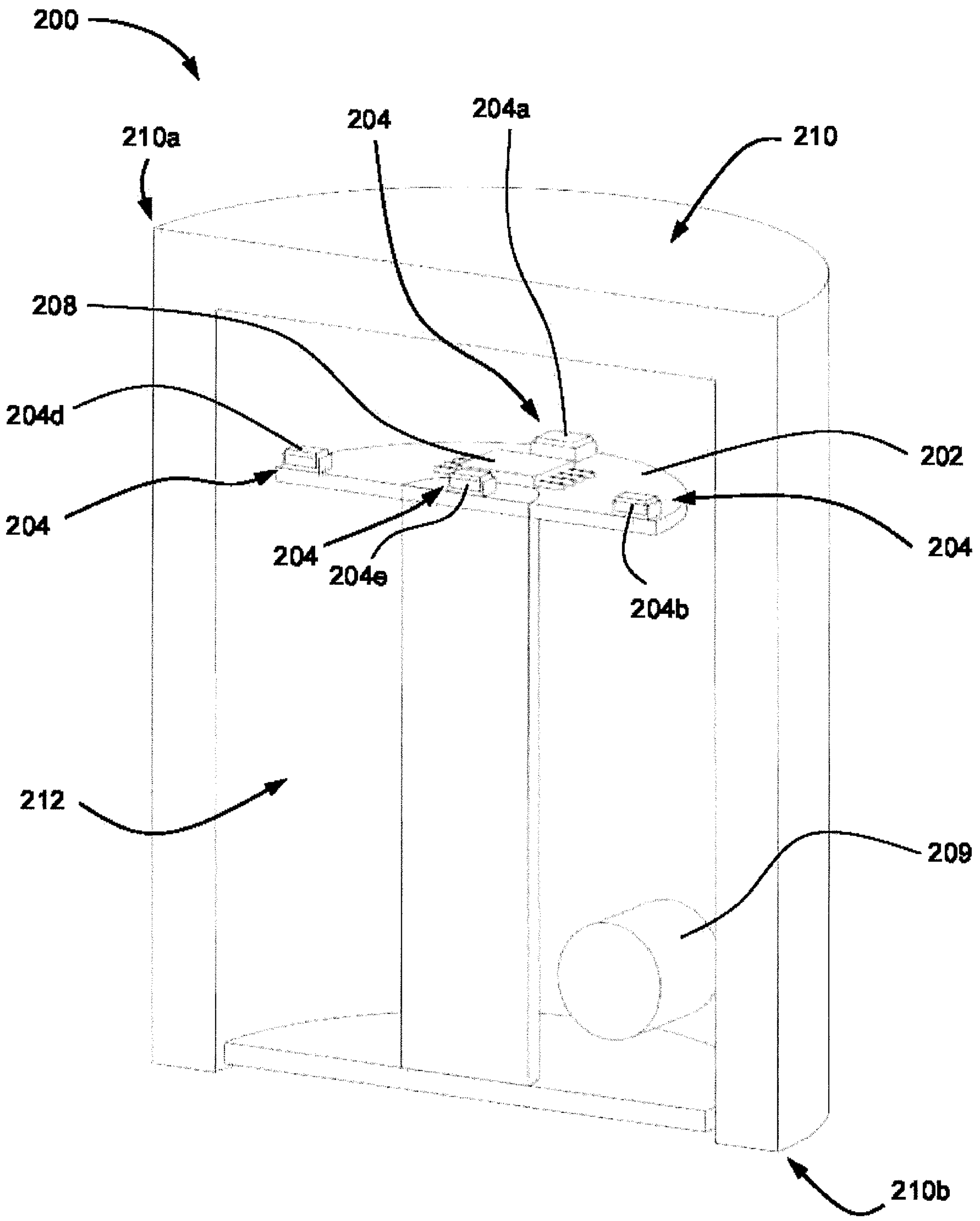
FIG. 16 is an assembled sectional view taken along B-B of FIG. 15.

FIGS. 15 and 16 show another light engine 200 that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers between 200 and 299 may be used to indicate parts corresponding to those discussed above numbered between 100 and 199 (e.g., substrate 202 corresponds generally to the substrate 102, discrete light emission points 204 correspond generally to the discrete light emission points 104, controller 208 corresponds generally to the controller 108, battery 209 corresponds generally to the battery 109, and housing 210 corresponds generally to the housing 110), though with any noted or shown deviations.

Embodiment 200 differs from the embodiment 100 in two apparent ways, though in other embodiments either of these differences can be implemented into the embodiment 100 without the other. First, the embodiment 200 includes additional discrete light emission points (labeled 204*a*, 204*b*, 204*c*, 204*d*, and 204*e*). Four of the discrete light emission points (204*a*, 204*b*, 204*c*, 204*d*) are spaced about a perimeter of the circular substrate 202, and one of the discrete light emission points (204*e*) is generally centered on the substrate 202.

Second, the housing 210 is shown to have a closed upper end 210*a* and an open lower end 210*b*, with the hollow internal cavity 212 being accessible through the open lower end 210*b*. As with the embodiment 100, the substrate 202 may be supported by a stilt or coupled to the housing 210.

Figure 17:
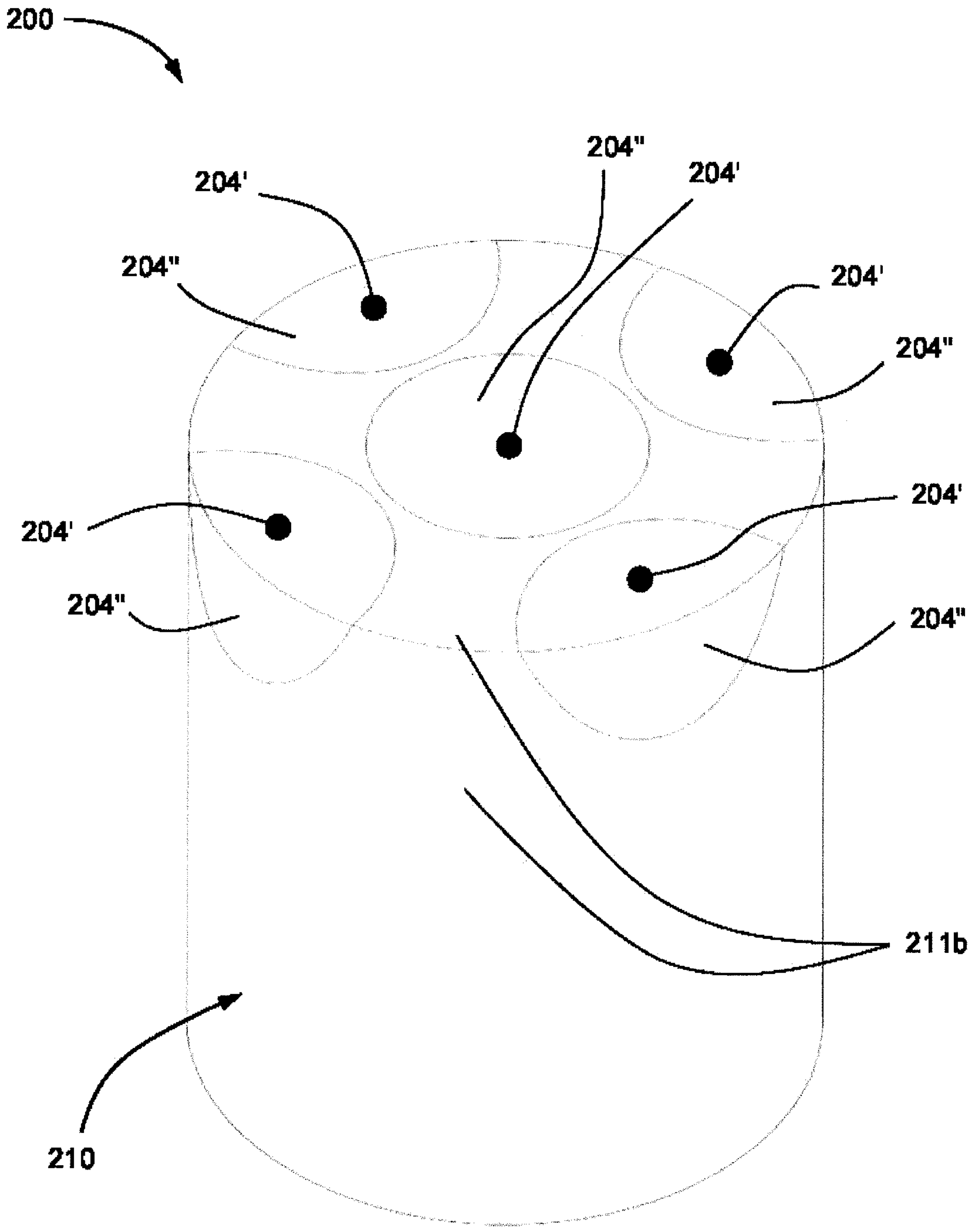
FIG. 17 is a perspective view of the lighting device of FIG. 15.

The methods of operation discussed elsewhere herein, as well as other methods now known or later developed, may be used to actuate the discrete light emission points 204. FIG. 17 shows each discrete light emission point 204 shining through the illumination shape 210 at a respective brightest point 204' on outer face 211*b* and having an area of brightness 204" on outer face 211*b*. While the areas of brightness 204" are not shown to overlap, the areas of brightness 204" may in fact overlap if desired (similar to the overlap of light from peripheral emissions discussed above).

Figure 18:
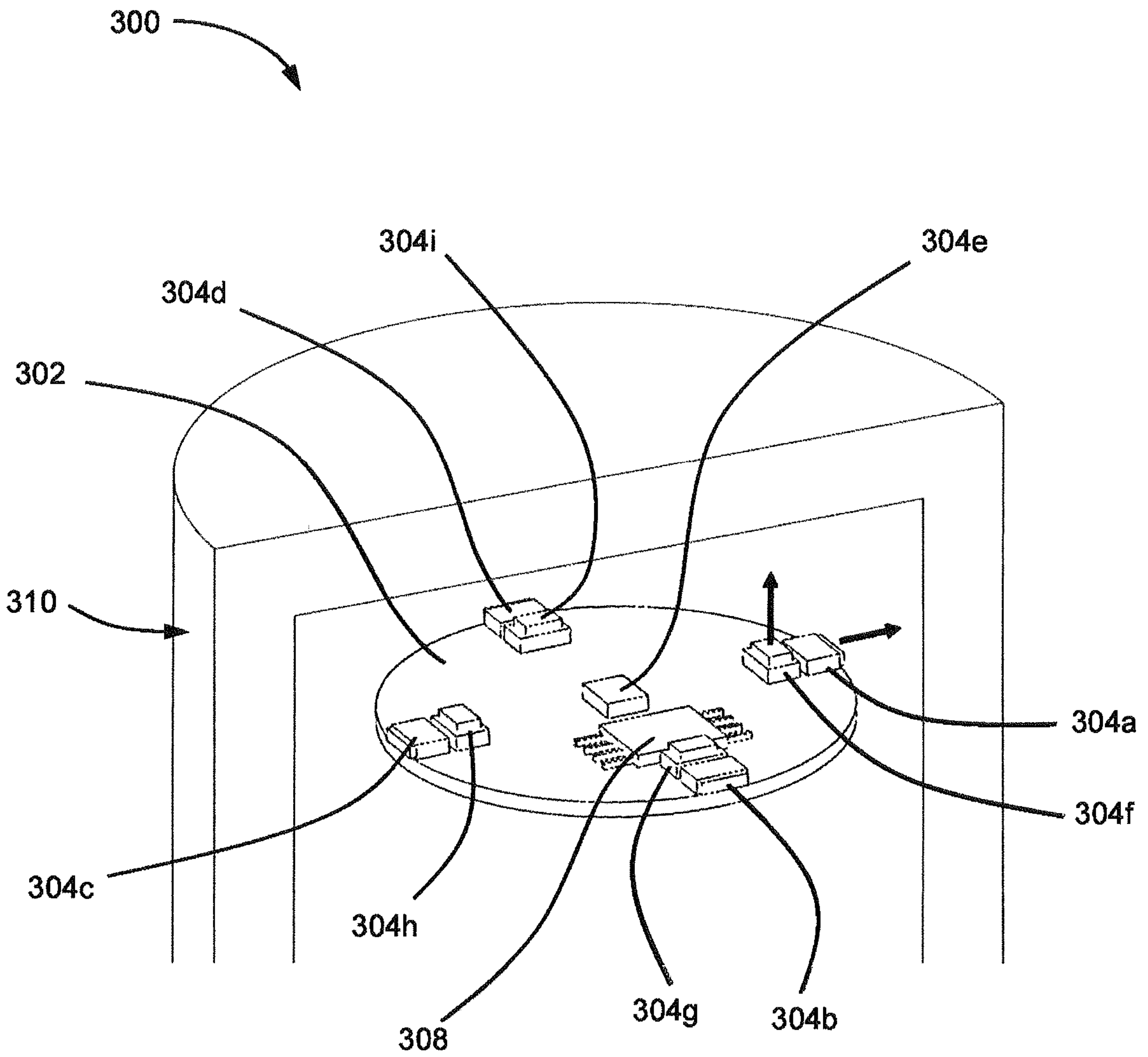
FIG. 18 is a section view illustrating yet another embodiment of the current disclosure.

FIG. 18 shows another light engine 300 that is substantially similar to the embodiment 200, except as specifically noted and/or shown, or as would be inherent. Further, those skilled in the art will appreciate that the embodiment 200 (and thus the embodiment 300) may be modified in various ways, such as through incorporating all or part of any of the various described embodiments, for example. For uniformity and brevity, reference numbers between 300 and 399 may be used to indicate parts corresponding to those discussed above numbered between 200 and 299 (e.g., substrate 302 corresponds generally to the substrate 202, discrete light emission points 304 correspond generally to the discrete light emission points 204, controller 308 corresponds generally to the controller 208, and housing 310 corresponds generally to the housing 210), though with any noted or shown deviations.

Embodiment 300 differs from the embodiment 200 primarily by including additional discrete light emission points (labeled 304*f*, 304*g*, 204*h*, and 304*i*). The discrete light emission points 304 are illustrated to be directional with the discrete light emission points 304*a*, 304*b*, 304*c*, 304*d* being directed generally outwardly and the discrete light emission points 304*e*, 304*f*, 304*g*, 304*h*, 304*i* being directed generally upwardly. The methods of operation discussed elsewhere herein, as well as other methods now known or later developed, may be used to actuate the discrete light emission points 304.

Figure 19:
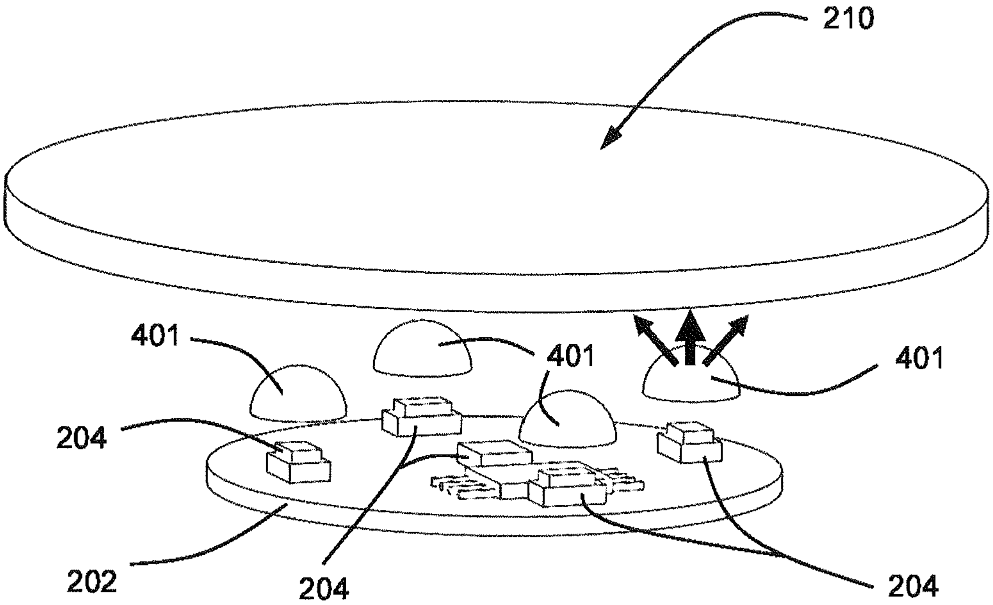
FIGS. 19 and 20 are partial views illustrating optical lenses that may be used with the various embodiments of the current disclosure.
Figure 20:
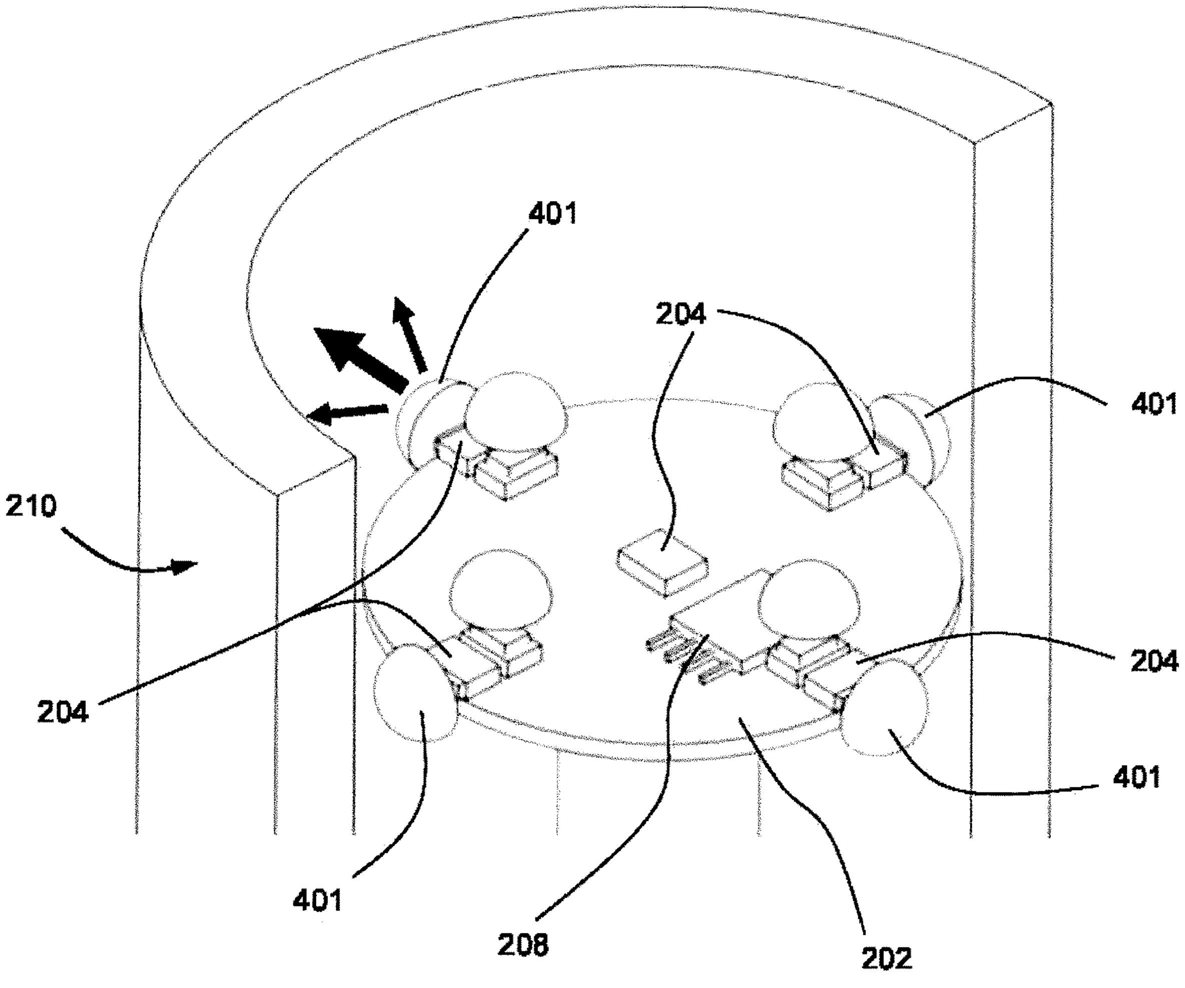

FIGS. 19 and 20 illustrate that optical lenses 401 may be used with any of the discrete light emission points discussed above (i.e., 104, 204, 304) to focus light at a desired point on the various illumination shapes (i.e., 110, 210, 310). FIG. 19 illustrates the light being focused upwardly, while FIG. 13 illustrates the light being focused outwardly.

Figure 21:
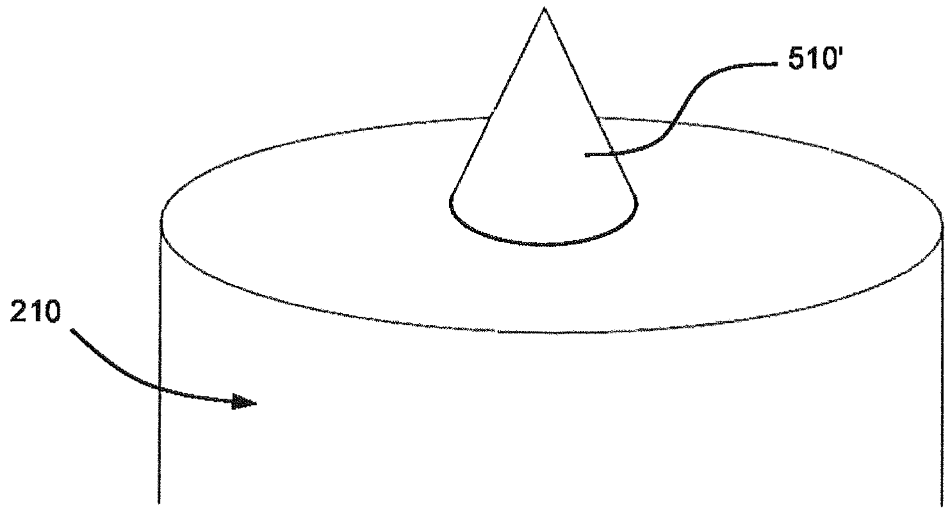
FIGS. 21 and 22 illustrate another illumination shape that may be used with the various embodiments of the current disclosure.
Figure 22:
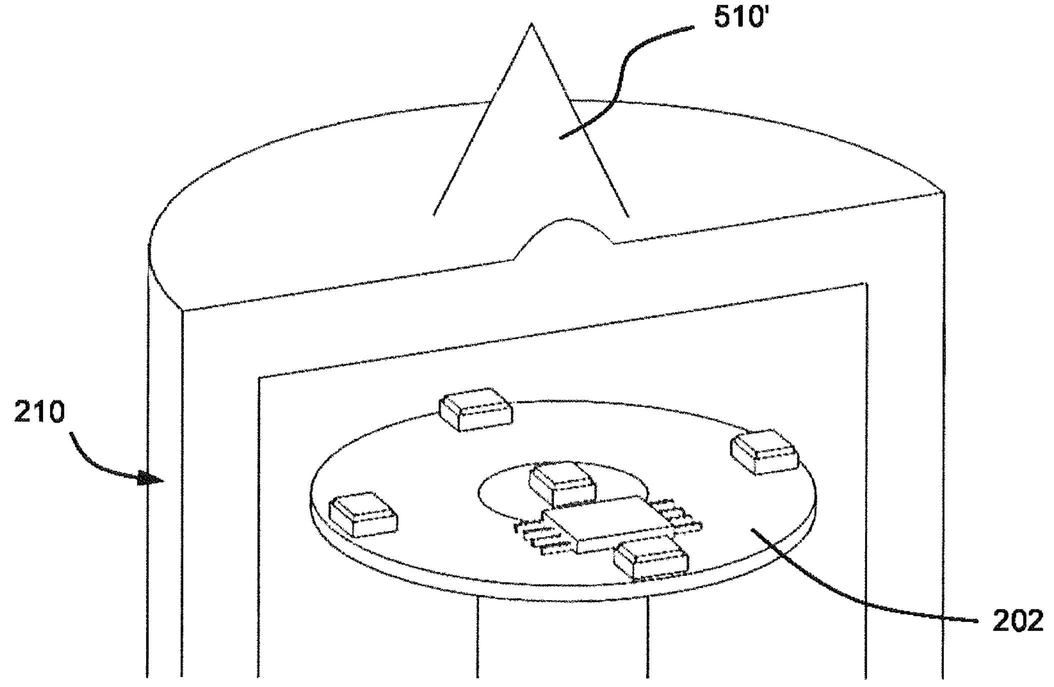

FIGS. 21 and 22 illustrate that any of the illumination shapes discussed above (i.e., 110, 210, 310) may have an extrusion (e.g., a conical extrusion) 510'. However, it may be particularly desirable for the extrusion 510' to be used with an embodiment having a discrete light emission point aligned therebelow. While the extrusion 510' is shown to be generally solid, it may instead be hollow.

Figure 23:
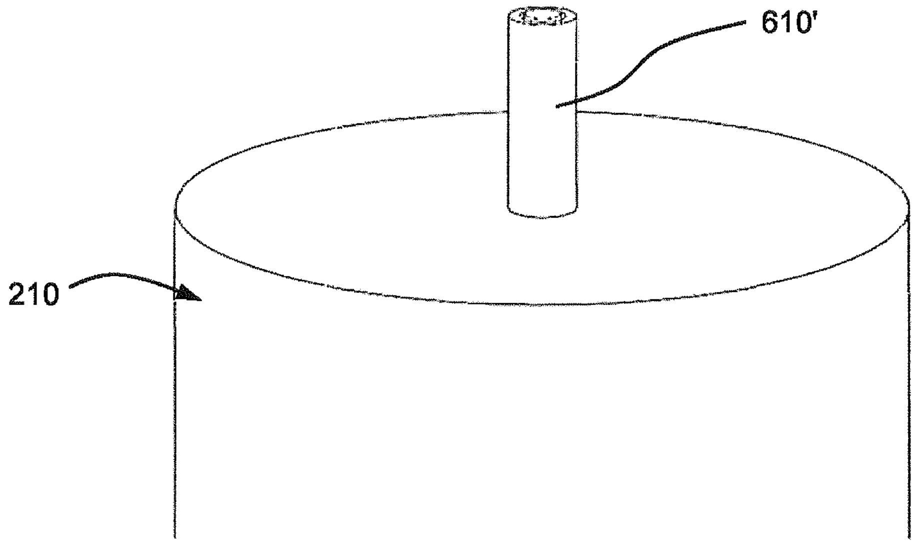
FIGS. 23 and 24 illustrate yet another illumination shape that may be used with the various embodiments of the current disclosure.
Figure 24:
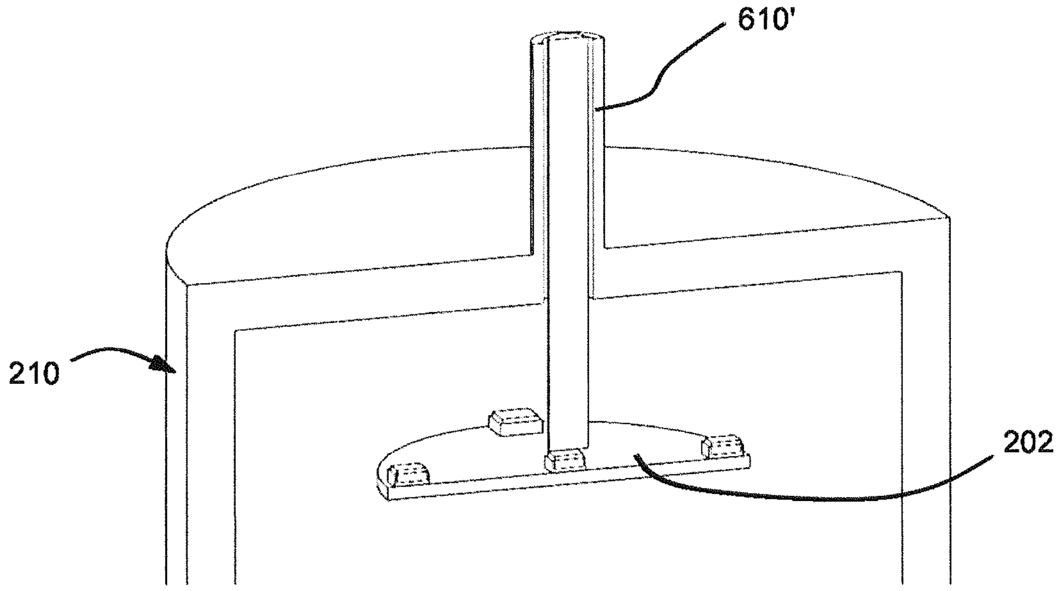

FIGS. 23 and 24 illustrate an extrusion 610' similar to (and interchangeable with) the extrusion 510', though the extrusion 610' is shown to be generally cylindrical and hollow. In some embodiments, the extrusion 610' is configured as a light pipe and directs light substantially out of an upper end of the extrusion 610'.

Figure 25:
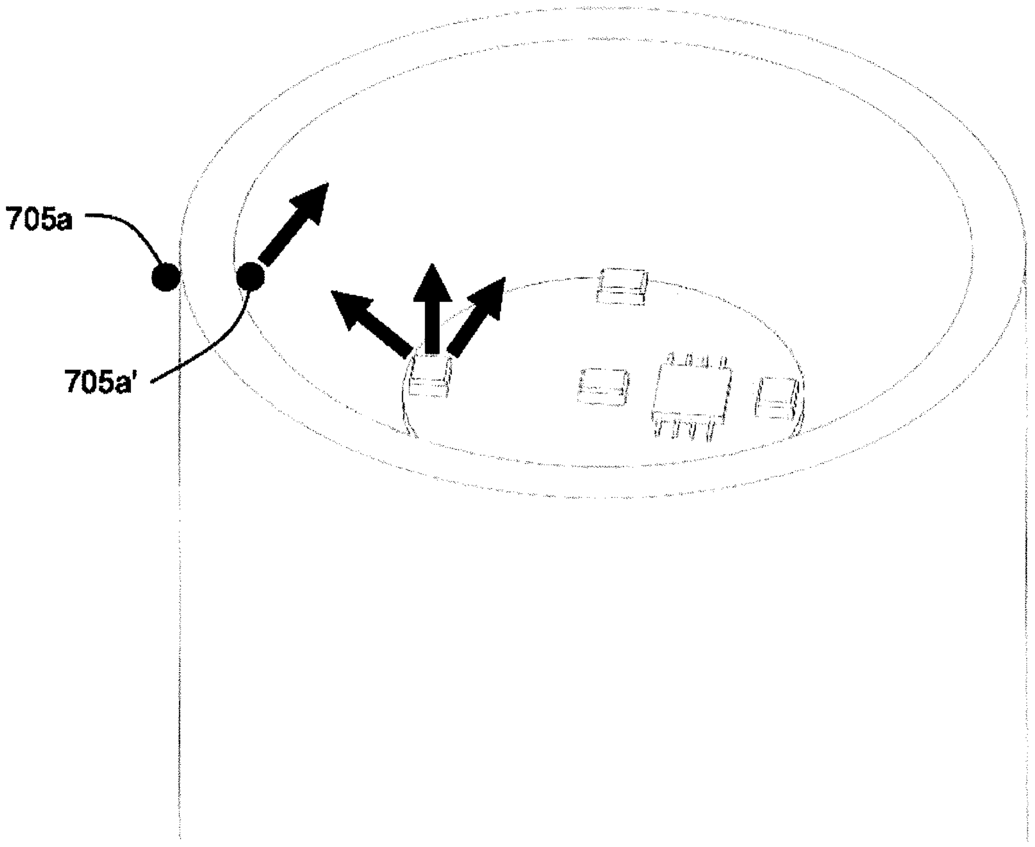
FIG. 25 is a perspective view of a lighting device according to still another embodiment of the current disclosure.

FIG. 25 illustrates that the illumination shapes discussed above (i.e., 110, 210, 310) may either have an open or transparent top, and a sidewall (e.g., inner face 111*a*) that is reflective. In such embodiments, no light from a discrete light emission point is emitted through the sidewall (e.g., to point 705*a*); instead, light is reflected at the point 705*a'* back through the top of the illumination shape.

Figure 26:
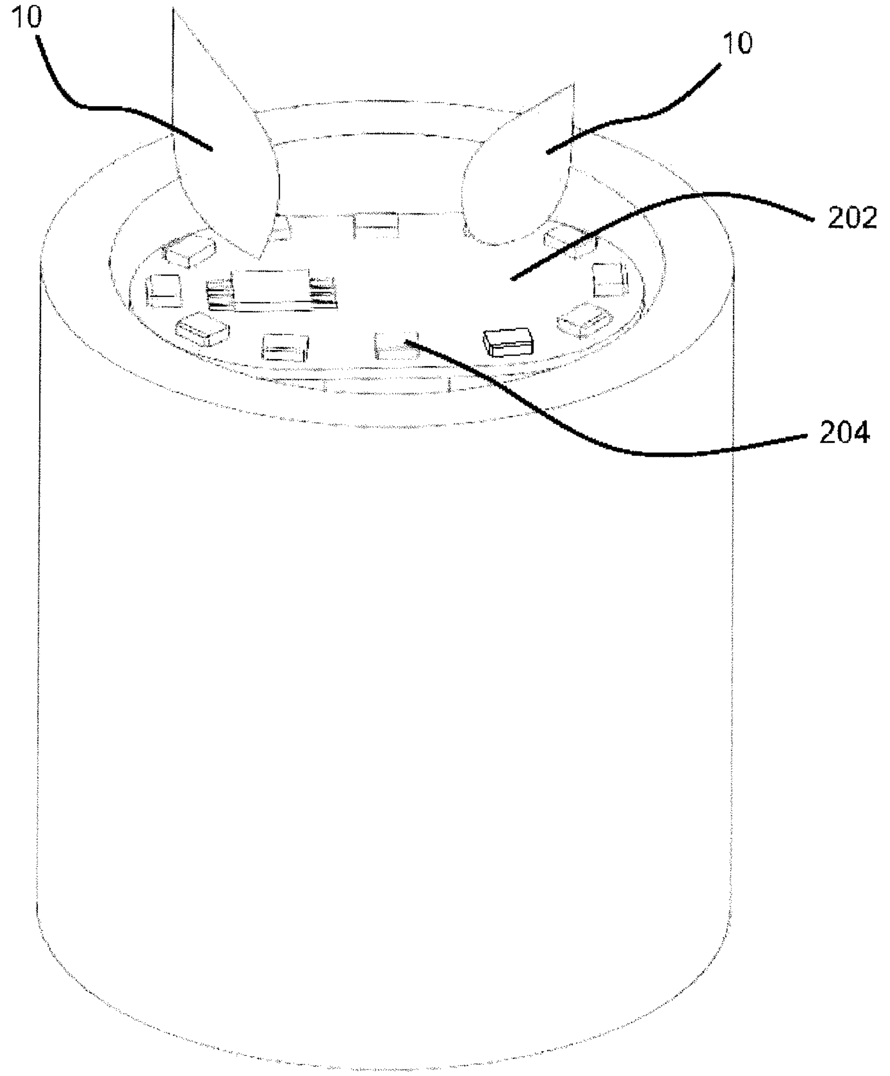
FIG. 26 is a perspective view of a lighting device according to still yet another embodiment of the current disclosure.

While some embodiments are directed to simulating a single flame in a burning wax candle, FIG. 26 illustrates that the substrates discussed above (102, 202, 302) and the discrete light emission points discussed above (104, 204, 304) may be configured in various shapes (e.g., racetrack-shaped) and also that multiple flames 10 may be simulated using the methods disclosed herein or other methods now known or later developed.

Figure 27:
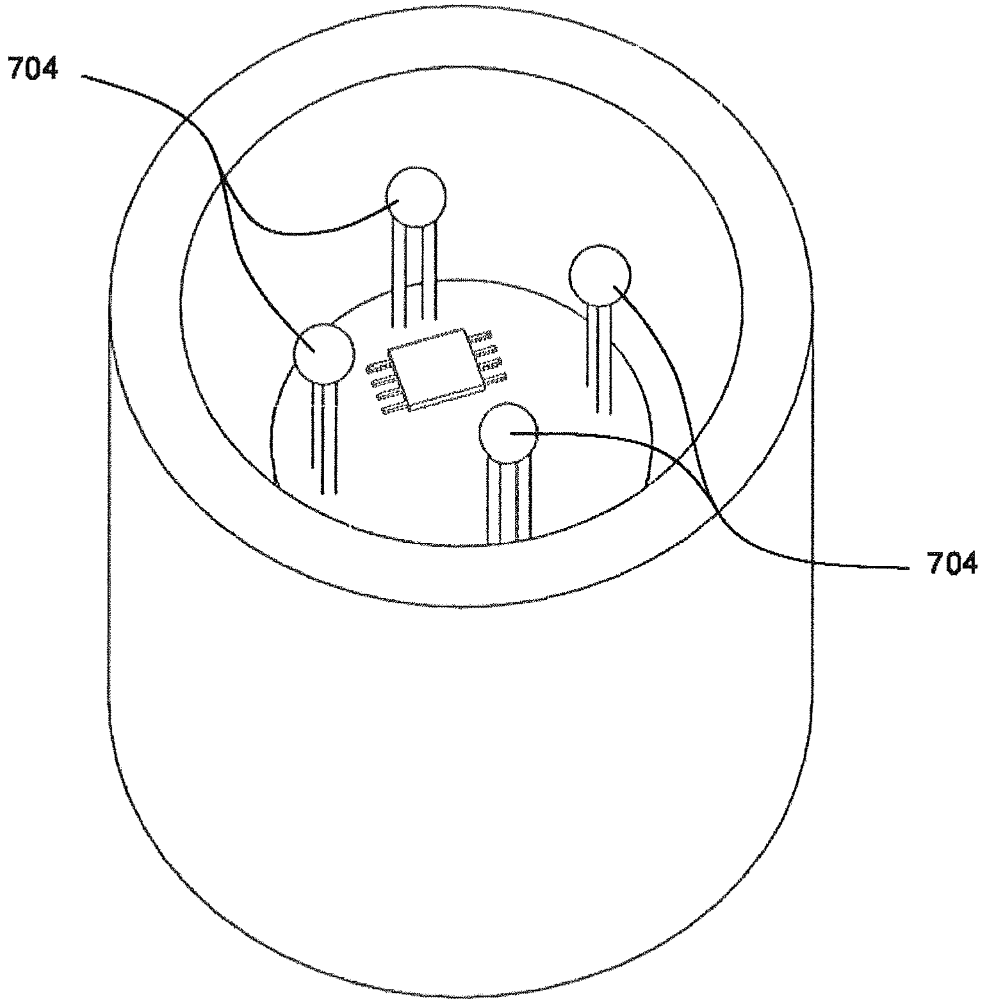
FIG. 27 illustrates alternate discrete light emission points that may be used with the various embodiments of the current disclosure.

FIG. 27 illustrates alternate discrete light emission points 704 that may be used with any of the embodiments disclosed herein. The discrete light emission points 704 are omnidirectional light sources, as will be appreciated by those skilled in the art.

Figure 28:
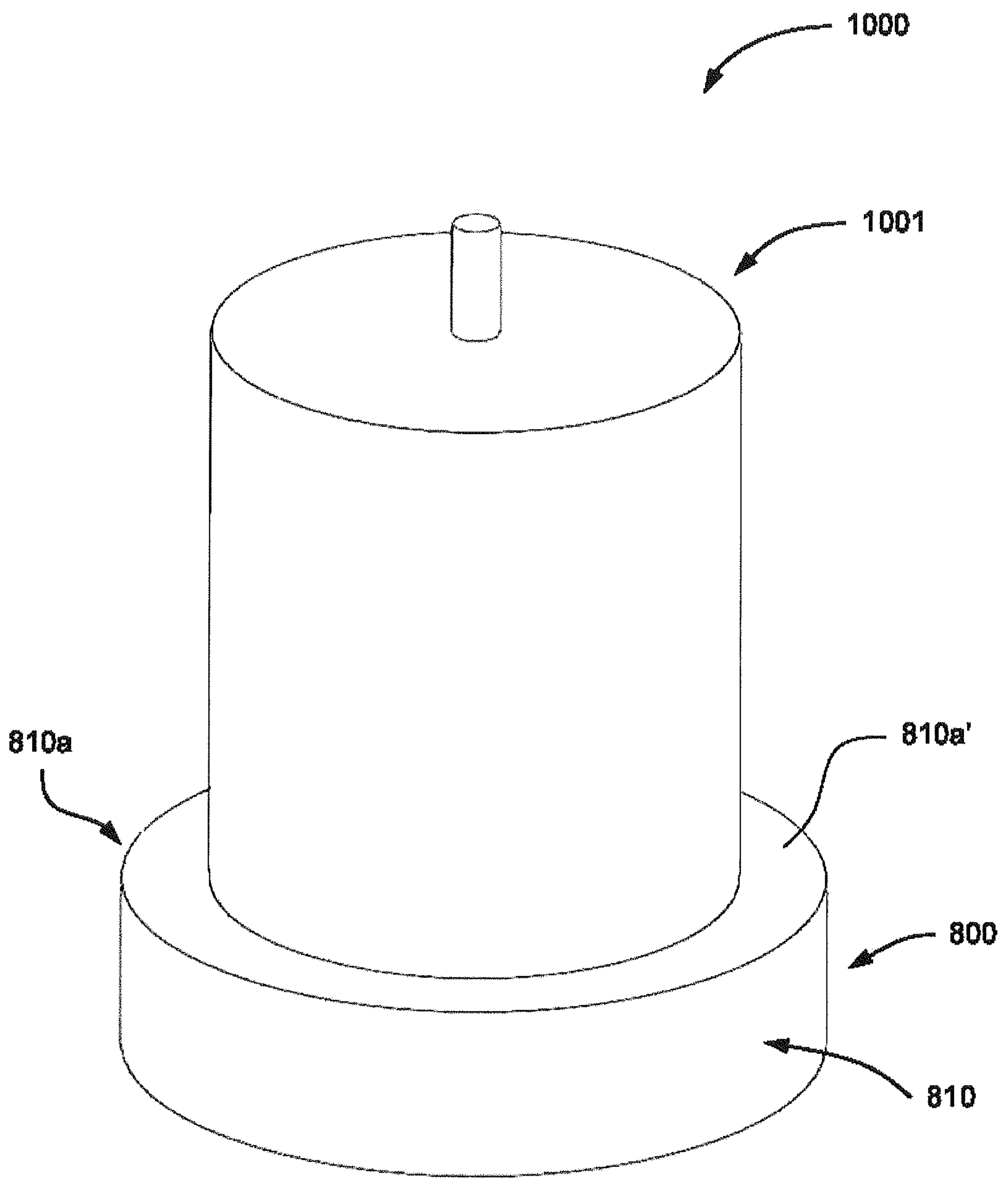
FIG. 28 is a perspective view of a lighting system according to a further embodiment of the current disclosure.
Figure 29:
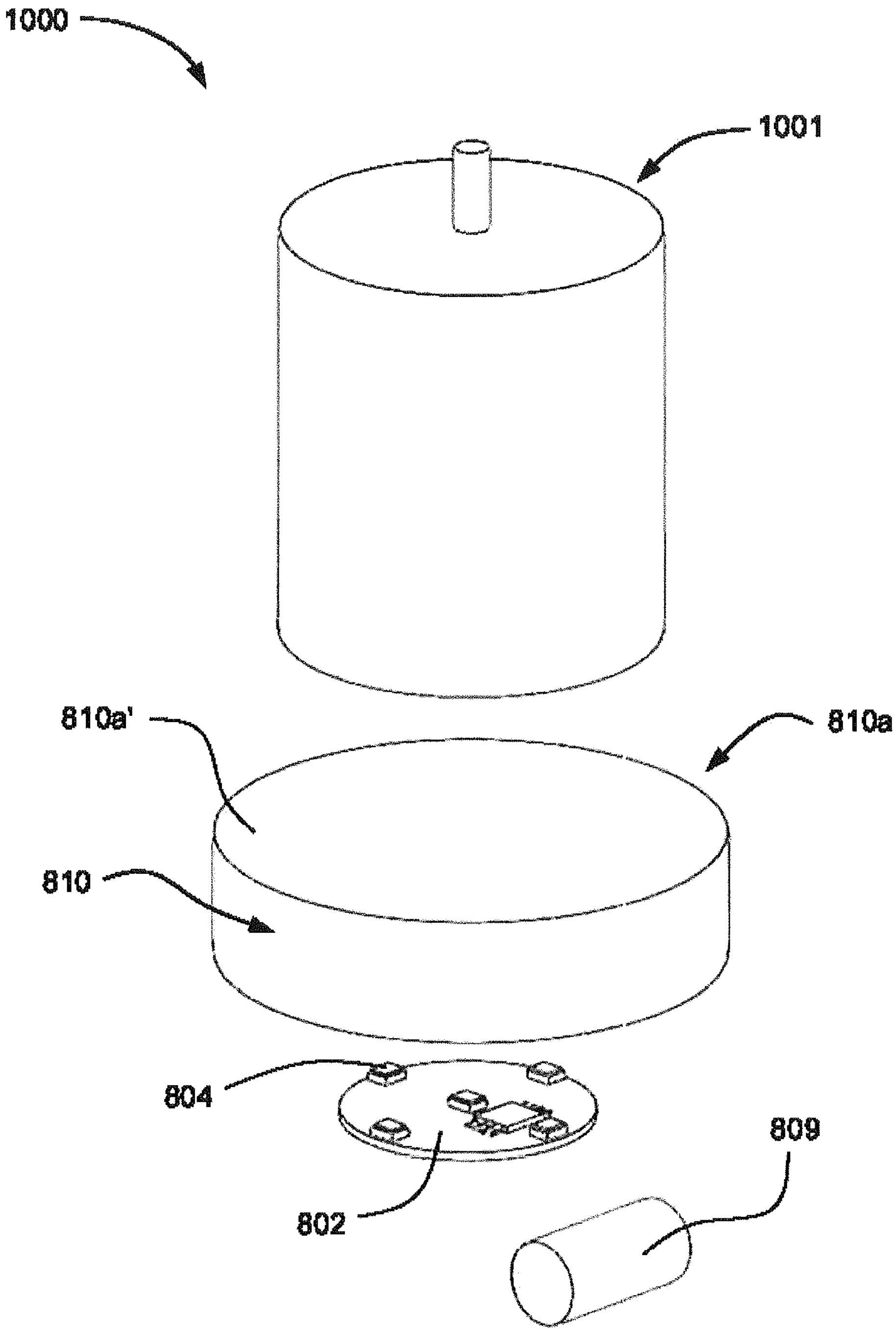
FIG. 29 is an exploded view of the lighting system of FIG. 28.
Figure 30:
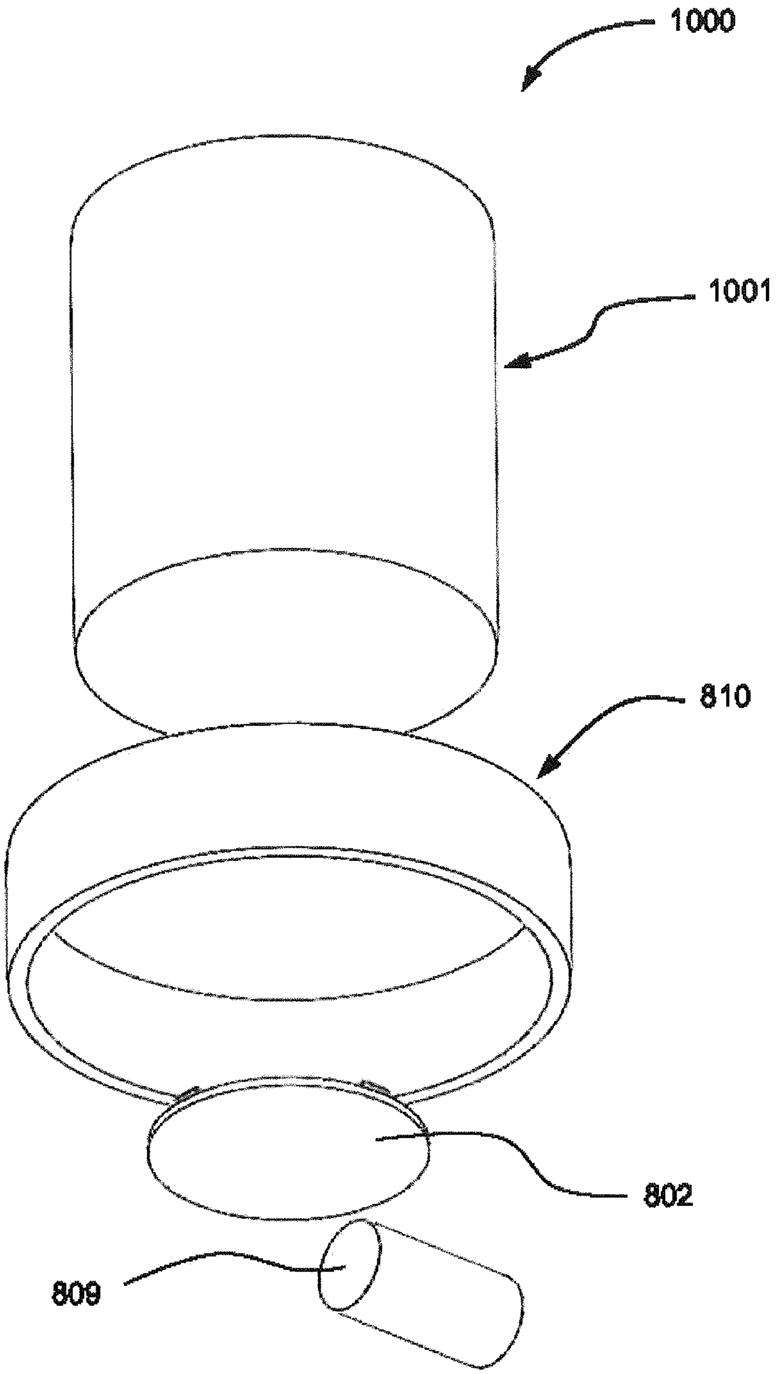
FIG. 30 is another exploded view of the lighting system of FIG. 28.

FIGS. 28 through 30 show a system 1000 that includes a lighting device 800 and a candle 1001. The lighting device 800 is substantially similar to the embodiment 200, except as specifically noted and/or shown, or as would be inherent. Further, those skilled in the art will appreciate that the embodiment 200 (and thus the embodiment 800) may be modified in various ways, such as through incorporating all or part of any of the various described embodiments, for example. For uniformity and brevity, reference numbers between 800 and 899 may be used to indicate parts corresponding to those discussed above numbered between 200 and 299 (e.g., substrate 802 corresponds generally to the substrate 202, discrete light emission points 804 correspond generally to the discrete light emission points 204, controller 808 corresponds generally to the controller 208, power source 809 corresponds generally to the power source 209, housing 810 corresponds generally to the housing 210, and housing upper end 810*a* corresponds generally to the housing upper end 210*a*), though with any noted or shown deviations.

Embodiment 800 differs from the embodiment 200 primarily by including a heat resistant face 810*a*' at the upper end 810*a*. The heat resistant face 810*a*' supports the candle 1001, which may be a traditional candle or any appropriate candle later developed. In use, the lighting device 800 may operate in accordance with the methods of operation discussed elsewhere herein, as well as through other methods now known or later developed (e.g., constantly on, fading patterns, flashing patterns, et cetera). As such, the discrete light emission points 804 may illuminate both the illumination shape 810 and the candle 1001. While it may be preferred in some embodiments for the heat resistant face 810*a*' to be translucent (at least in areas), in some embodiments it may be preferred for the heat resistant face 810*a*' to instead, or also, include transparent or open areas for light to pass through.

Figure 31:
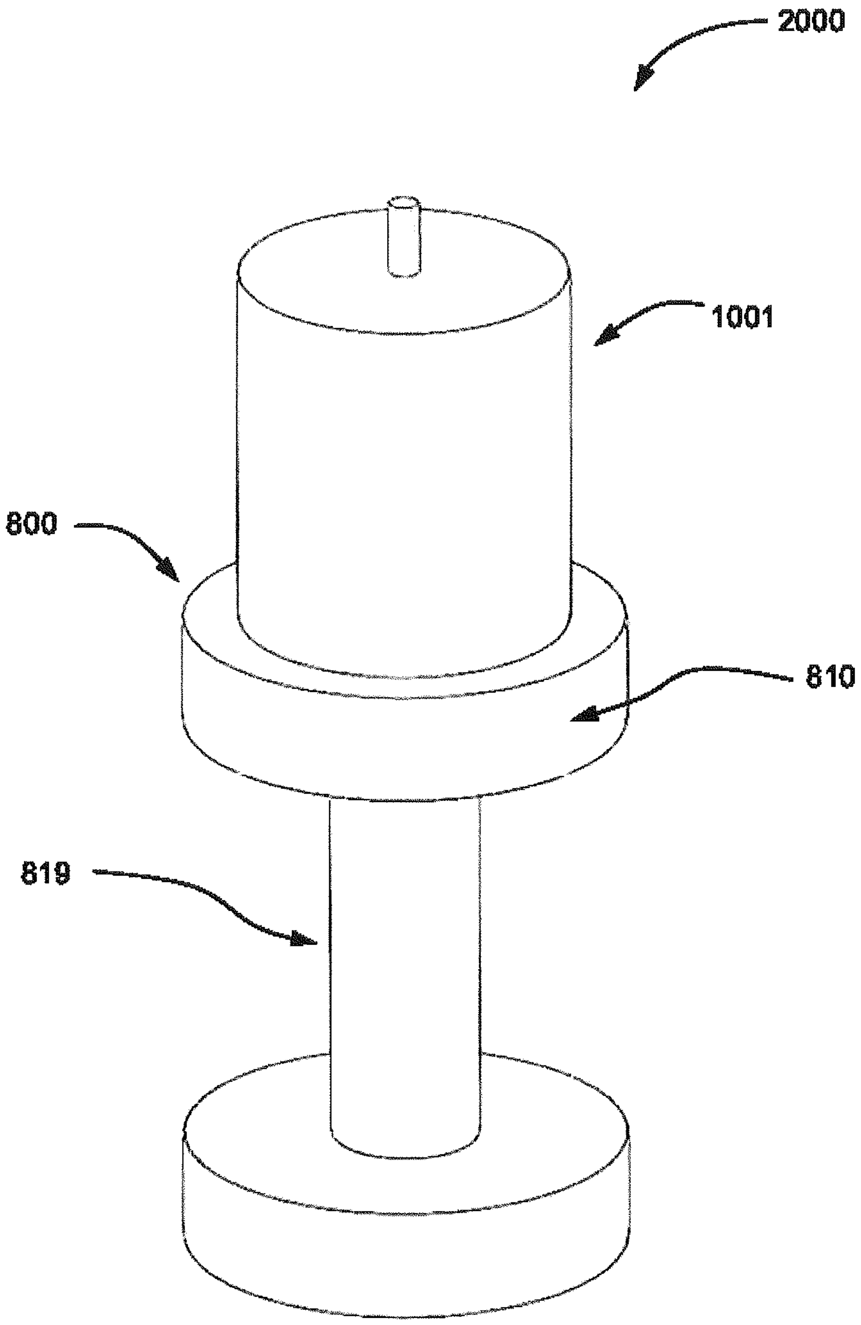
FIG. 31 is a perspective view of a lighting system according to another embodiment of the current disclosure.

FIG. 31 shows a system 2000 that is generally similar to the system 1000. Embodiment 2000 differs from the embodiment 1000 primarily by including a pedestal 819 under the lighting device 800. The pedestal 819 may be formed with, permanently coupled to, or removably coupled to the housing 810.

Figure 32:
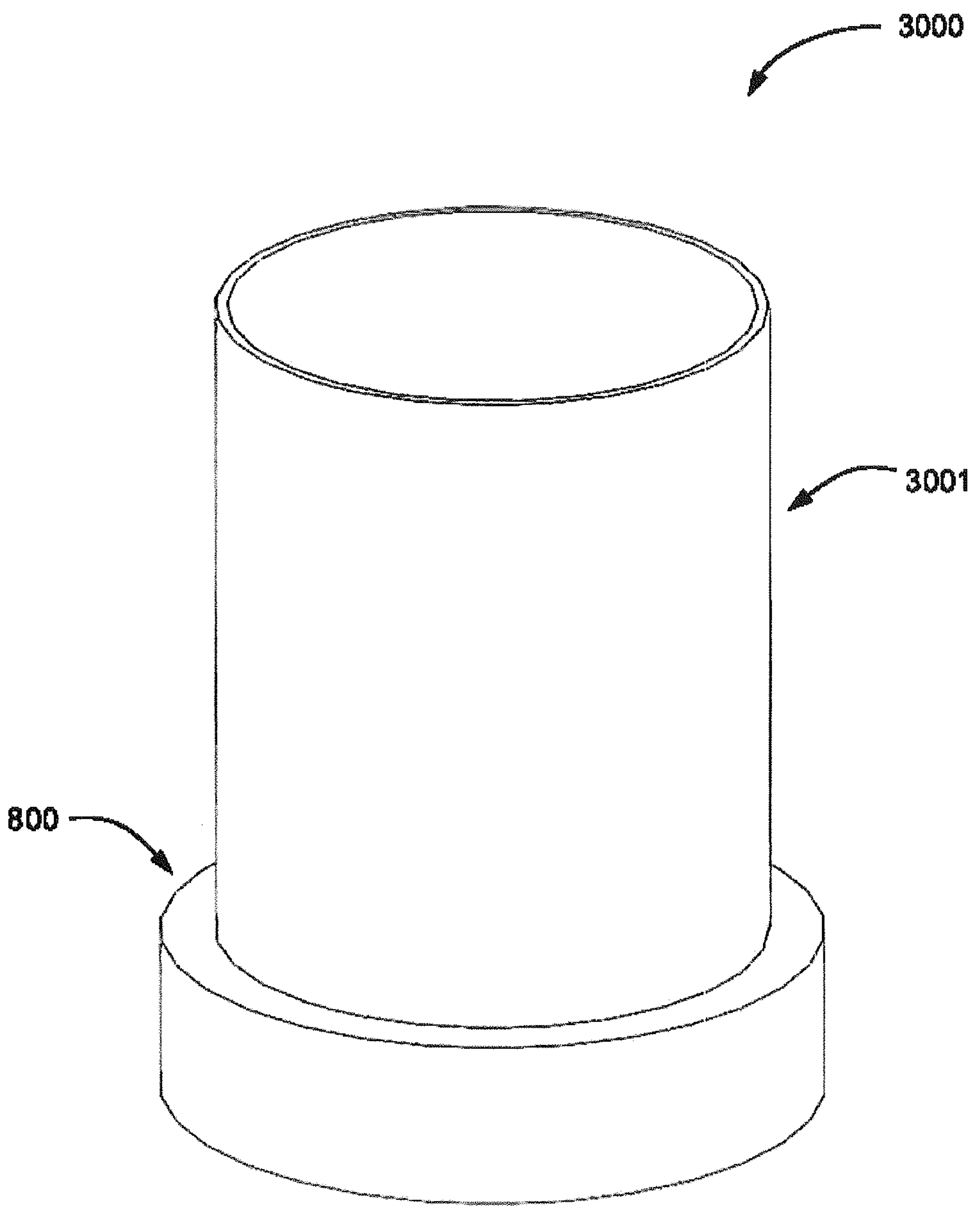
FIG. 32 is a perspective view of a lighting system according to still another embodiment of the current disclosure.

FIG. 32 shows a system 3000 that is generally similar to the system 1000. Embodiment 3000 differs from the embodiment 1000 primarily by omitting the candle 1001 and instead including a display object 3001 (e.g., a semi-translucent glass).

Figure 33:
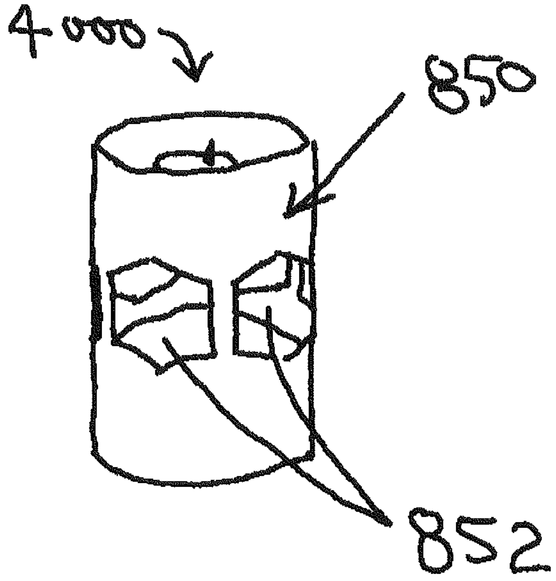
FIG. 33 is a perspective view of a lighting system according to yet another embodiment of the current disclosure.

FIG. 33 shows a system 4000 that is generally similar to the system 2000. Embodiment 4000 differs from the embodiment 2000 by including an enclosure 850 having openings 852. Further, instead of, or in addition to, an upper side of the substrate having discrete light emission points, a lower side of the substrate may have discrete light emission points in the embodiment 4000. Such discrete light emission points may be incorporated into any of the embodiments disclosed herein and may be actuated in accordance with any of the embodiments disclosed herein; and if discrete light emission points are included both on the upper and lower sides of the substrate, then it may be particularly desirable for the discrete light emission points on the underside to generally correspond with the discrete light emission points on the upper side and for corresponding discrete light emission points to be actuated together.

Figure 34:
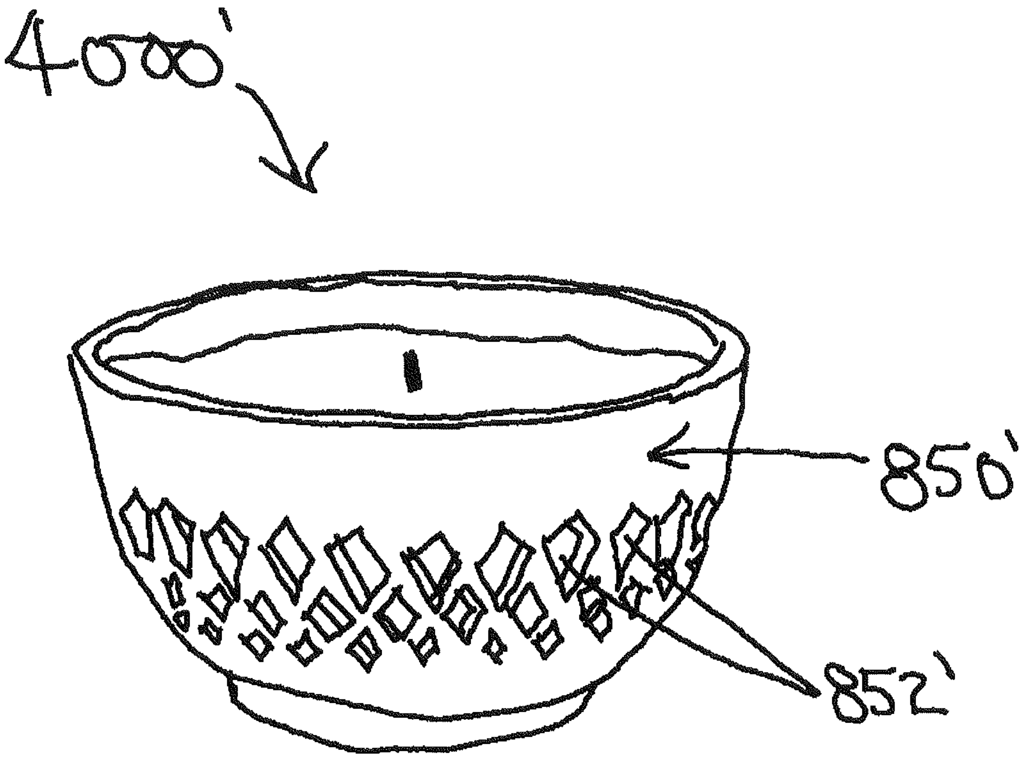
FIG. 34 is a perspective view of a lighting system according to still yet another embodiment of the current disclosure.

FIG. 34 shows a system 4000' that is generally similar to the system 4000. Embodiment 4000' differs from the embodiment 4000 primarily by substituting a different enclosure 850' having openings 852' for the enclosure 850.

Figure 35:
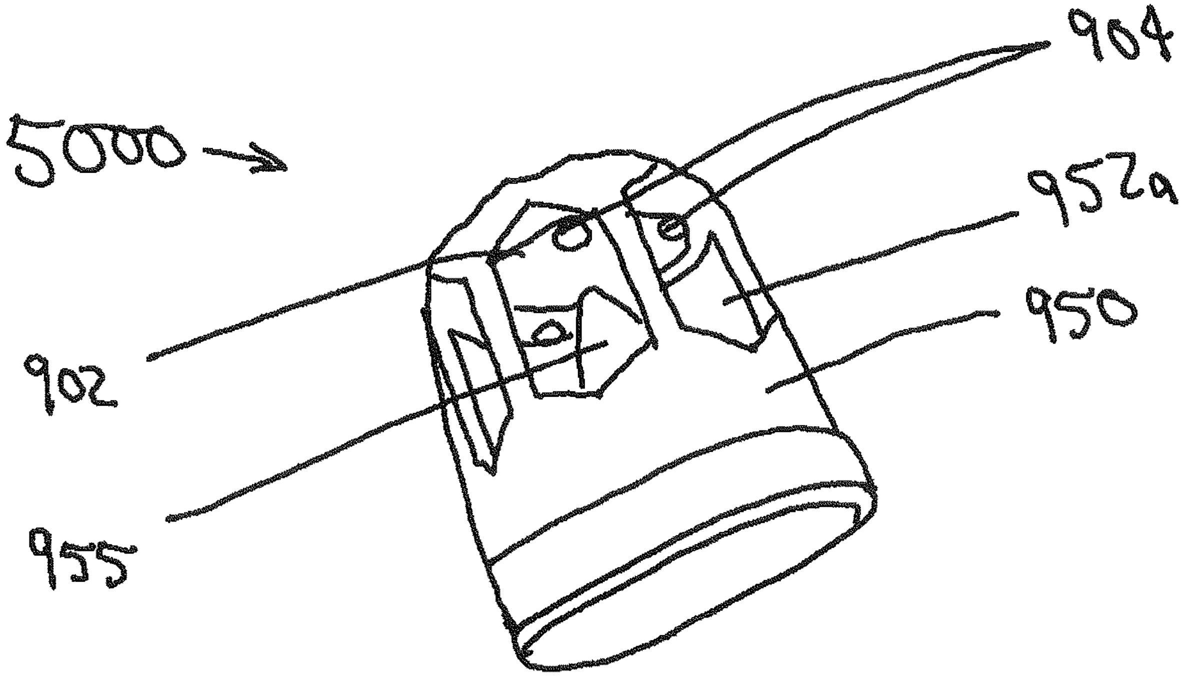
FIG. 35 is a perspective view of a lighting system according to a further embodiment of the current disclosure.
Figure 36:
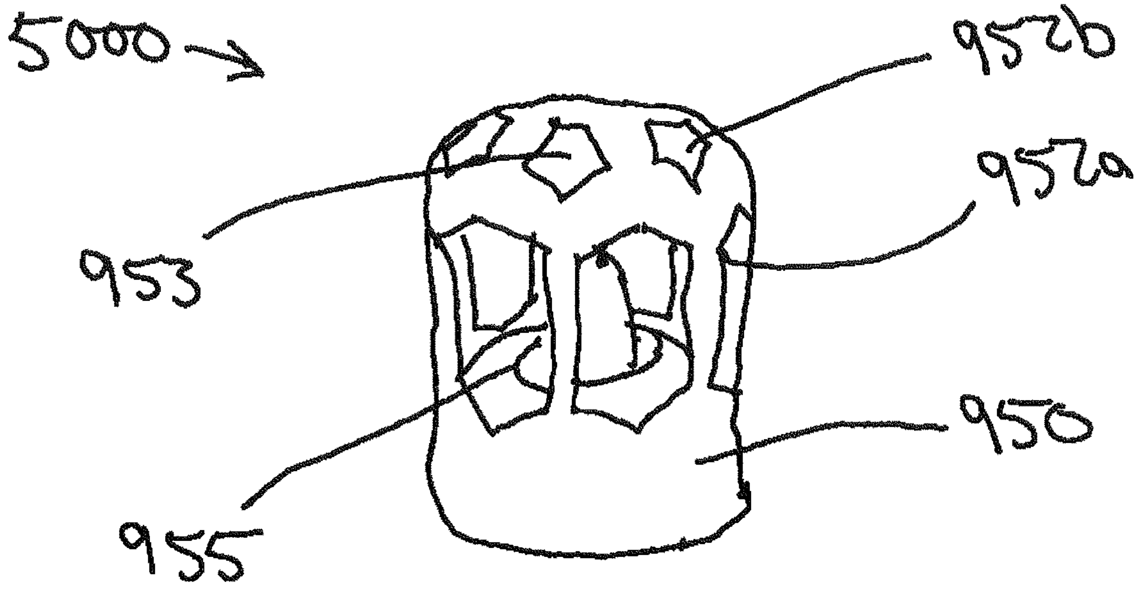
FIG. 36 is another perspective view of the lighting system of FIG. 35.

FIGS. 35 and 36 show a system 5000 that is generally similar to the system 4000. The system 5000 includes an enclosure 950 that is similar to the enclosure 850, though the housing 950 includes side openings 952*a* and also upper openings 952*b*. Though not shown in FIGS. 35 and 36, textured glass, polycarbonate, or other translucent material may be located in the openings 952*a* and/or the openings 952*b*. The substrate 902, which is substantially similar to the substrate 102, includes discrete light emission points 904 similar to the discrete light emission points 104 on both upper and lower sides as discussed above regarding the embodiment 4000. A translucent cover 953 is between the substrate 902 and the upper openings 952*b*. During operation as discussed in the various embodiments herein, light may be directed both through the openings 952*a*, 952*b* and also off internal structure 955.

Figure 37:
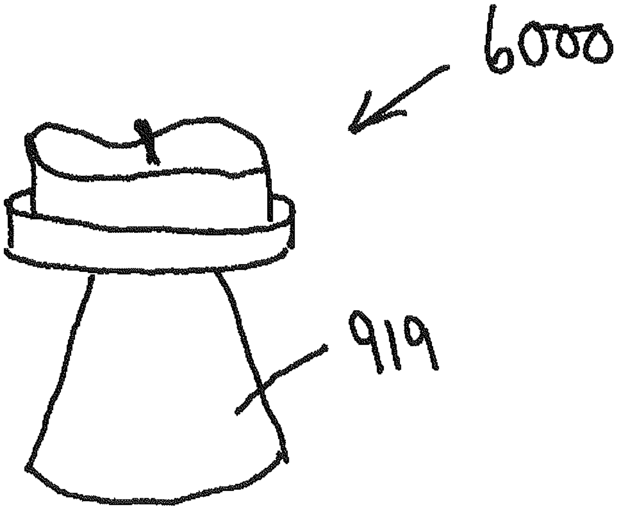
FIG. 37 is a perspective view of a lighting system according to a still further embodiment of the current disclosure.
Figure 38:
FIG. 38 is another perspective view of the lighting system of FIG. 37.
Figure 39:
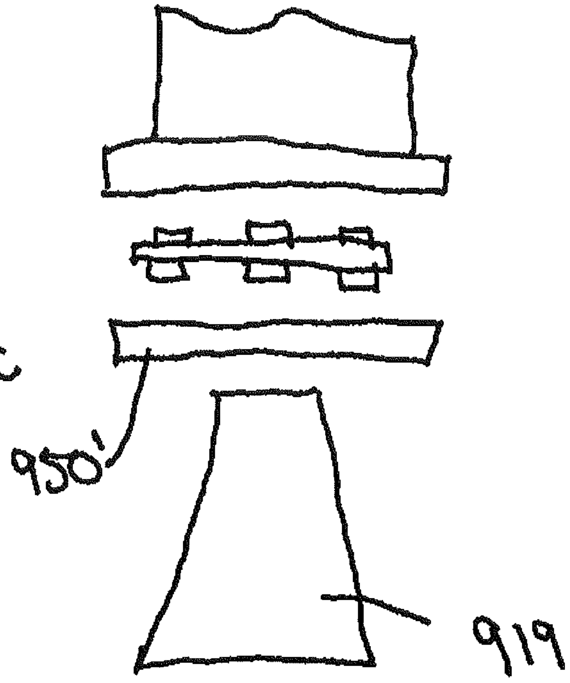
FIG. 39 is an exploded view of the lighting system of FIG. 37.

FIGS. 37 through 39 show another system 6000 that is generally similar to those discussed above except as is apparent. More particularly, the system 6000 has a pedestal 919 and the DLEPs shine through a lower glass enclosure 950' and/or through openings 952*c* in a lower enclosure 950'. A controller in the system 6000 may operate the DLEPs as described in the various embodiments above.

Many additional embodiments may incorporate the various features disclosed herein. In the various embodiments where light is directed through an illumination shape, enclosure, or opening, the shape and material (if any) present in the illumination shape, enclosure, or opening may be selected to provide desired illumination patterns and shadows during operation.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Various steps in described methods may be undertaken simultaneously or in other orders than specifically provided.

The invention claimed is:

1. A lighting system, comprising:

a housing having cavity, an area, and a support surface; the area being at least one item selected from the group consisting of a translucent area, a transparent area, and an open area;

a candle atop the support surface;

a plurality of discrete light emission points (DLEPs) positioned in the cavity for emitting light through the area, at least one of the DLEPs extending from a lower face of a substrate when the lighting system is in an operating configuration;

a power source; and a controller in communication with the plurality of DLEPs and the power source to cause the plurality of DLEPs to simulate a burning wax candle;

wherein the controller:

at time T1:

actuates a first of the DLEPs according to a first intensity value; and actuates a second of the DLEPs according to a second intensity value; and at time T2:

actuates the first DLEP according to an altered first intensity value, the altered first intensity value being determined by combining the first intensity value with a first change value, the first change value being within a first predetermined range; and actuates the second DLEP according to an altered second intensity value, the altered second intensity value being determined by combining the second intensity value with a second change value, the second change value being within a second predetermined range;

wherein an increase from the first intensity value to the altered first intensity value simulates an increase in optimal flame chemistry;

wherein an increase from the second intensity value to the altered second intensity value simulates an increase in optimal flame chemistry;

wherein a decrease from the first intensity value to the altered first intensity value simulates a decrease in optimal flame chemistry;

wherein a decrease from the second intensity value to the altered second intensity value simulates a decrease in optimal flame chemistry;

wherein an increase in absolute value of the first change value simulates an increase in turbulence;

wherein an increase in absolute value of the second change value simulates an increase in turbulence;

wherein a decrease in absolute value of the first change value simulates a decrease in turbulence; and wherein a decrease in absolute value of the second change value simulates a decrease in turbulence.

2. The lighting device of claim 1, wherein:

the first predetermined range includes positive and negative values;

when the first change value is positive, the first change value is added to the first intensity value to determine the altered first intensity value; and when the first change value is negative, the first change value is subtracted from the first intensity value to determine the altered first intensity value.

3. The lighting device of claim 2, wherein:

the second predetermined range includes positive and negative values;

when the second change value is positive, the second change value is added to the second intensity value to determine the altered second intensity value; and when the second change value is negative, the second change value is subtracted from the second intensity value to determine the altered second intensity value.

4. The lighting device of claim 1, wherein:

when the first intensity value is less than a first brightness target, an absolute value of the first change value is added to the first intensity value to determine the altered first intensity value; and when the first intensity value is less than the first brightness target, an absolute value of the first change value is subtracted from the first intensity value to determine the altered first intensity value.

5. The lighting device of claim 4, when the second intensity value is less than a second brightness target, an absolute value of the second change value is added to the second intensity value to determine the altered second intensity value; and when the second intensity value is less than the second brightness target, an absolute value of the second change value is subtracted from the second intensity value to determine the altered second intensity value.

6. The lighting device of claim 5, wherein the first brightness target and the second brightness target are the same.

7. The lighting device of claim 1, wherein the first predetermined range and the second predetermined range are the same.

8. The lighting device of claim 1, wherein the first change value and the second change value are the same.

9. The lighting device of claim 1, wherein the first change value is randomly generated.

10. The lighting device of claim 1, wherein the controller causes at least one of the DLEPs to flicker.

11. A lighting system, comprising:

a housing having cavity, an area, and a support surface; the area being at least one item selected from the group consisting of a translucent area, a transparent area, and an open area;

a candle atop the support surface;

a plurality of discrete light emission points (DLEPs) positioned in the cavity for emitting light through the area, at least one of the DLEPs extending from a lower face of a substrate when the lighting system is in an operating configuration;

a power source; and a controller in communication with the plurality of DLEPs and the power source to cause the plurality of DLEPs to simulate a burning wax candle;

wherein the controller:

actuates a first of the DLEPs according to sequential first intensity values; and actuates a second of the DLEPs according to sequential second intensity values;

wherein the sequential first intensity values are determined by sequentially combining first change values to an initial first intensity value;

wherein the sequential second intensity values are determined by sequentially combining second change values to an initial second intensity value;

wherein the first change values are randomly selected within a first predetermined range;

wherein the second change values are randomly selected within a second predetermined range;

wherein a sequential increase in the first intensity values simulates an increase in optimal flame chemistry;

wherein a sequential increase in the second intensity values simulates an increase in optimal flame chemistry;

wherein a sequential decrease in the first intensity values simulates a decrease in optimal flame chemistry;

wherein a sequential decrease in the second intensity values simulates a decrease in optimal flame chemistry;

wherein a sequential increase in absolute value of the first change values simulates an increase in turbulence;

wherein a sequential increase in absolute value of the second change values simulates an increase in turbulence;

wherein a sequential decrease in absolute value of the first change values simulates a decrease in turbulence; and
wherein a sequential decrease in absolute value of the second change values simulates a decrease in turbulence.

12. The lighting device of claim 11, wherein:
the first predetermined range includes positive and negative values;
when a respective first change value is positive, the respective first change value is added; and
when a respective first change value is negative, the respective first change value is subtracted.

13. The lighting device of claim 11, wherein:
when a respective first intensity value is less than a first brightness target, an absolute value of a respective first change value is added; and
when a respective first intensity value is less than the first brightness target, an absolute value of a respective first change value is subtracted.

14. The lighting device of claim 11, wherein the first change values are the same as the second change values.

15. The lighting device of claim 11, wherein the first change values are randomly generated.

16. The lighting device of claim 11, wherein the power source is at least one item selected from the group consisting of: a battery, a solar panel, and an interface to an electrical power grid.

17. The lighting system of claim 11, wherein at least one of the DLEPs extends from an upper face of the substrate when the lighting system is in the operating configuration.

* * * * *